United States Patent
Saber et al.

(10) Patent No.: US 11,924,848 B2
(45) Date of Patent: Mar. 5, 2024

(54) METHOD AND DEVICE FOR PDCCH REPETITION IN MULTI-TRP SYSTEM

(71) Applicant: Samsung Electronics Co., Ltd., Gyeonggi-do (KR)

(72) Inventors: Hamid Saber, San Diego, CA (US); Jung Hyun Bae, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 238 days.

(21) Appl. No.: 17/470,627

(22) Filed: Sep. 9, 2021

(65) Prior Publication Data

US 2022/0116981 A1 Apr. 14, 2022

Related U.S. Application Data

(60) Provisional application No. 63/165,464, filed on Mar. 24, 2021, provisional application No. 63/156,511, filed on Mar. 4, 2021, provisional application No. 63/133,933, filed on Jan. 5, 2021, provisional application No. 63/108,698, filed on Nov. 2, 2020, (Continued)

(51) Int. Cl.
| | |
|---|---|
| *H04W 72/23* | (2023.01) |
| *H04L 1/00* | (2006.01) |
| *H04L 1/1867* | (2023.01) |
| *H04W 24/10* | (2009.01) |
| *H04W 72/1273* | (2023.01) |

(52) U.S. Cl.
CPC ........... *H04W 72/23* (2023.01); *H04L 1/0007* (2013.01); *H04L 1/1896* (2013.01); *H04W 24/10* (2013.01); *H04W 72/1273* (2013.01)

(58) Field of Classification Search
CPC . H04W 72/23; H04W 72/1273; H04W 24/10; H04L 1/1896; H04L 1/0007
See application file for complete search history.

(56) References Cited

U.S. PATENT DOCUMENTS

| | | |
|---|---|---|
| 2019/0253904 A1 | 8/2019 | Tsai et al. |
| 2019/0297637 A1 | 9/2019 | Liou et al. |

(Continued)

FOREIGN PATENT DOCUMENTS

WO WO 2019/244218 12/2019

OTHER PUBLICATIONS

Huawei, HiSilicon, "Summary of Enhancements on Multi-TRP/Panel Transmission", R1-1909602, 3GPP TSG RAN WG1 Meeting #98, Aug. 26-30, 2019, 76 pages.

(Continued)

*Primary Examiner* — Kent Krueger
(74) *Attorney, Agent, or Firm* — The Farrell Law Firm, P.C.

(57) ABSTRACT

A method and a user equipment (UE) are provided for explicitly linking repeated physical downlink control channels (PDCCHs). The UE receives the repeated PDCCHs from a network. Each of the repeated PDCCHs include downlink control information (DCI) that schedules reception of a same physical downlink shared channel (PDSCH) at the UE. The UE links the repeated PDCCHs having common PDCCH candidate numbers across search space (SS) sets of a control resource set (CORESET). The repeated PDCCHs are received in accordance with the UE and the network communicating using a multi-transmission and reception point (TRP) repetition scheme or a multi-TRP multi-chance scheme.

20 Claims, 14 Drawing Sheets

Related U.S. Application Data provisional application No. 63/090,009, filed on Oct. 9, 2020.

(56) References Cited

U.S. PATENT DOCUMENTS

| | | | |
|---|---|---|---|
| 2020/0153572 A1 | 5/2020 | Tsai et al. | |
| 2020/0153581 A1 | 5/2020 | Tsai et al. | |
| 2021/0051693 A1 | 2/2021 | Liou et al. | |
| 2021/0250981 A1 | 8/2021 | Takeda et al. | |
| 2021/0352636 A1* | 11/2021 | Shao | H04L 5/0053 |
| 2022/0217694 A1* | 7/2022 | Kim | H04L 1/1864 |
| 2022/0330301 A1* | 10/2022 | Huang | H04L 5/0091 |
| 2023/0050015 A1* | 2/2023 | Kang | H04L 5/0091 |
| 2023/0073095 A1* | 3/2023 | Kim | H04W 72/1273 |
| 2023/0119439 A1* | 4/2023 | Kim | H04W 24/08 370/329 |

OTHER PUBLICATIONS

European Search Report dated Feb. 25, 2022 issued in counterpart application No. 21196857.3-1213, 11 pages.

\* cited by examiner

METHOD AND DEVICE FOR PDCCH REPETITION IN MULTI-TRP SYSTEM

PRIORITY

This application is based on and claims priority under 35 U.S.C. § 119(e) to U.S. Provisional Patent Applications filed on Oct. 9, 2020, Nov. 2, 2020, Jan. 5, 2021, Mar. 4, 2021, and Mar. 24, 2021, in the United States Patent and Trademark Office and assigned Serial Nos. 63/090,009, 63/108,698, 63/133,933, 63/156,511, and 63/165,464, respectively, the contents of which are incorporated herein by reference.

FIELD

The present disclosure relates generally to multiple-input multiple-output (MIMO) transmission schemes, and more particularly, to transmission schemes for physical downlink control channel (PDCCH) transmission from multiple transmission and reception points (TRPs) to schedule a same channel.

BACKGROUND

MIMO transmission schemes have been widely used in digital communication to increase the capacity of wireless channels. The $3^{rd}$ Generation Partnership Project (3GPP) mobile communication standard supports MIMO transmission schemes in which a PDSCH or physical uplink shared channel (PUSCH) is transmitted from different physical antennas or different antenna ports.

Different antenna ports of a MIMO transmission scheme may be within a single TRP, in which case the scheme is referred to as a single TRP transmission scheme. Different antenna ports of one or different channels may also be within multiple TRPs, which are typically non-co-located, in which case the scheme is referred to as a multi-TRP (M-TRP) scheme. An example of the M-TRP scheme includes a rank-2 PDSCH transmitted by two antenna ports, where a first antenna port is within a first TRP and a second antenna port is within a second TRP.

M-TRP transmissions can be categorized into single-downlink control information (DCI)-TRP and multi-DCI M-TRP. With single-DCI M-TRP, a single PDCCH is transmitted from one of the TRPs and schedules one or more PDSCHs. In one transmission scheme, different layers of a single PDSCH are transmitted from different TRPs. In other transmission schemes, multiple PDSCHs (multiplexed in a time domain or a frequency domain) with the same transport block (TB) are transmitted, where all layers of a single PDSCH are transmitted from a respective one of the TRPs. Different PDSCHs may be transmitted from different TRPs according to a pattern.

FIG. 1 is a diagram illustrating single-DCI M-TRP transmission scheme. A single DCI (PDCCH) 106 is transmitted to a user equipment (UE) 114 from a first TRP 102, and schedules a PDSCH 108 with two layers. A first layer 110 of the PDSCH is transmitted from a first antenna port within the first TRP 102, while a second layer 112 is transmitted from a second antenna port within a second TRP 104.

With multi-DCI M-TRP, each TRP transmits its own PDCCH, which schedules a PDSCH that is also transmitted from the ports within the same TRP.

FIG. 2 is a diagram illustrating multi-DCI M-TRP transmission. Each of the two TRPs, a first TRP 202 and a second TRP 204, transmits their own DCI (PDCCH), a first DCI 206 and a second DCI 208, respectively, to a UE 214. Each DCI schedules one PDSCH with two-layer transmission, a first PDSCH 210 and a second PDSCH 212. All of the layers of a given PDSCH are transmitted from the antenna ports within the same TRP.

Different multiplexing schemes can be applied for PDCCH transmission. The schemes include time division multiplexing (TDM), frequency division multiplexing (FDM), special division multiplexing (SDM), and single frequency network (SFN).

For a non-SFN M-TRP PDCCH transmission, the following schemes can be considered.

In a non-repetition scheme, one encoding/rate matching is for a PDCCH with two transmission configuration indicator (TCI) states. With this scheme, a single PDCCH candidate has two different TCI states. For example, specific control channel elements (CCEs)/resource element groups (REGs) of a candidate may be associated with a first TCI state and the remainder of the CCEs/REGs may be associated with a second TCI state.

In a repetition scheme, encoding/rate matching is based on one repetition, and the same coded bits are repeated for another repetition. Each repetition has the same number of CCEs and coded bits, and corresponds to the same DCI payload.

In a multi-chance scheme, separate DCIs schedule the same physical downlink shared channel (PDSCH)/physical uplink shared channel (PUSCH)/reference signal (RS)/transport block (TB)/etc., or result in the same outcome.

SUMMARY

According to one embodiment, a method is provided for explicitly linking repeated PDCCHs by a UE. The UE receives the repeated PDCCHs from a network. Each of the repeated PDCCHs include DCI that schedules reception of a same PDSCH at the UE. The UE links the repeated PDCCHs having common PDCCH candidate numbers across search space (SS) sets of a control resource set (CORESET). The repeated PDCCHs are received in accordance with the UE and the network communicating using a multi-TRP repetition scheme or a multi-TRP multi-chance scheme.

According to one embodiment, a UE is provided that includes a processor and a non-transitory computer readable storage medium storing instructions. When executed, the instructions cause the processor to receive repeated PDCCHs from a network. Each of the repeated PDCCHs include DCI that schedules reception of a same PDSCH at the UE. When executed, the instructions further cause the processor to link the repeated PDCCHs having common PDCCH candidate numbers across SS sets of a CORESET. The repeated PDCCHs are received in accordance with the UE and the network communicating using a multi-TRP repetition scheme or a multi-TRP multi-chance scheme.

BRIEF DESCRIPTION OF THE DRAWINGS

The above and other aspects, features, and advantages of certain embodiments of the present disclosure will be more apparent from the following detailed description, when taken in conjunction with the accompanying drawings, in which.

DETAILED DESCRIPTION

Figure 1:
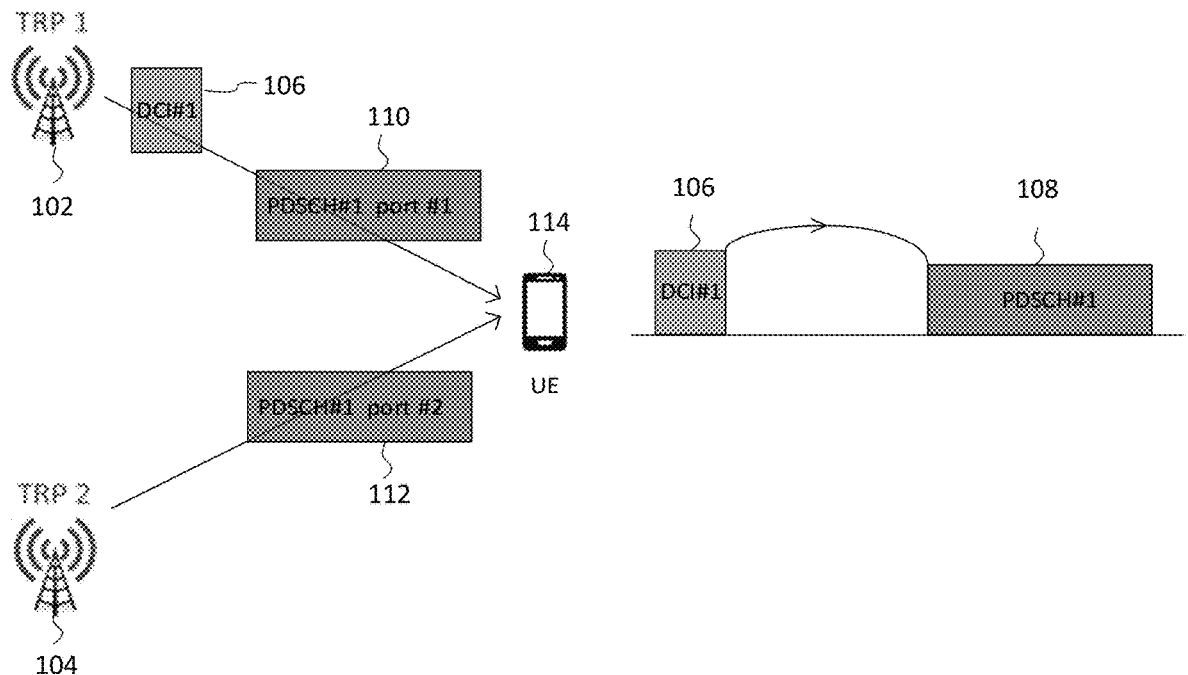
FIG. 1 is a diagram illustrating a single-DCI M-TRP transmission.
Figure 2:
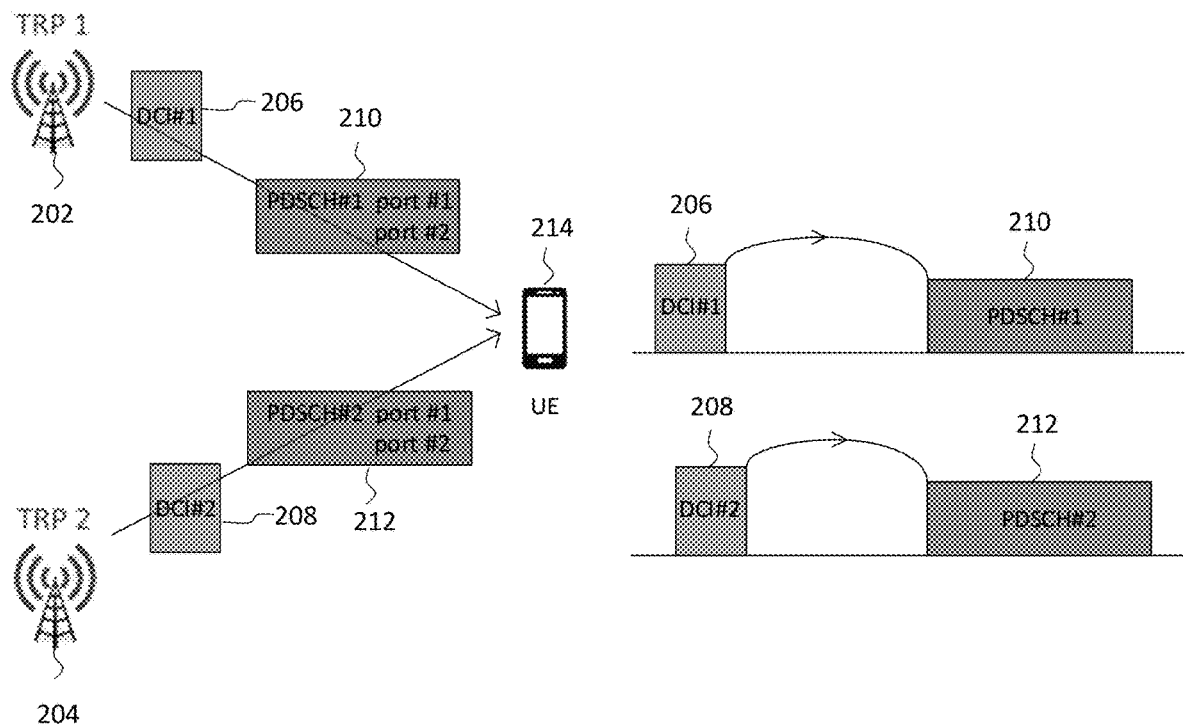
FIG. 2 is a diagram illustrating multi-DCI M-TRP transmission.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present disclosure relates to multiple repeated PDCCHs scheduling the same PDSCH/PUSCH or providing control information to a group of UEs. Moreover, the present disclosure introduces: SS sets/PDCCH candidate's linkage properties, details of a linkage between PDCCH candidates, and prioritization of CORESETs with different quasi co-location (QCL)-type D.

Methods described herein enable proper functioning of M-TRP PDCCH repetition by introducing enhancements to at least SS set linkage, candidate linkage, and CORSET monitoring prioritization.

Many of the embodiments described in detail below apply to both repetition and multi-chance schemes, and they may be considered the same scheme where the core feature is two linked PDCCHs providing the same information about scheduling a PDSCH.

Figure 3:
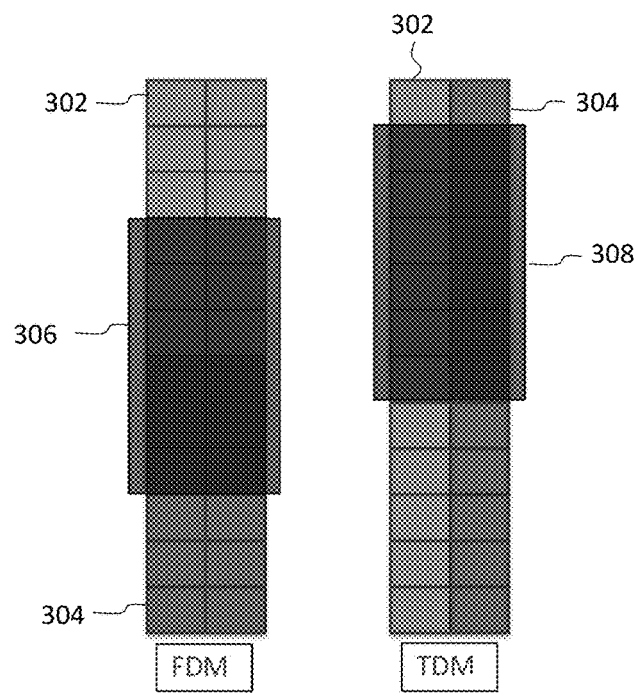
FIG. 3 a diagram illustrating PDCCHs according to the 1SS-1CORESET scheme, according to an embodiment.

In order to enable a PDCCH transmission with two different TCI states, one approach is to associate one control resource set (CORESET) with two different TCI states. This scheme is referred to as 1SS-1CORESET scheme. FIG. 3 is a diagram illustrating PDCCHs according to the 1SS-1CORESET scheme, according to an embodiment. Blocks 302 correspond to REGs/CCEs associated with a first TCI state, while blocks 304 correspond to REGs/CCEs associated with to a second TCI state. Accordingly, when using FDM, a first PDCCH (with DCI) 306 includes REGs/CCEs that are split evenly between the first and second TCI states. Similarly, when using TDM, a second PDCCH (with DCI) 308 also includes REGs/CCEs that are split evenly between the first and second TCI states.

Accordingly, the following schemes may be considered. In scheme A, a DCI or PDCCH candidate (in a given SS set) is associated with both TCI states of the CORESET. In scheme B, two sets of PDCCH candidates (in a given SS set) are associated with the two TCI states of the CORESET, respectively. In scheme C, two sets of PDCCH candidates are associated with two corresponding SS sets, where both SS sets are associated with the CORESET and each SS set is associated with only one TCI state of the CORESET.

For schemes B and C, the following cases may be considered for mapping between different PDCCH candidates with different TCI states. In case 1, Two or more PDCCH candidates are explicitly linked together (UE knows the linking before decoding). In case 2, Two or more PDCCH candidates are not explicitly linked together (UE does not know the linking before decoding).

Figure 4:
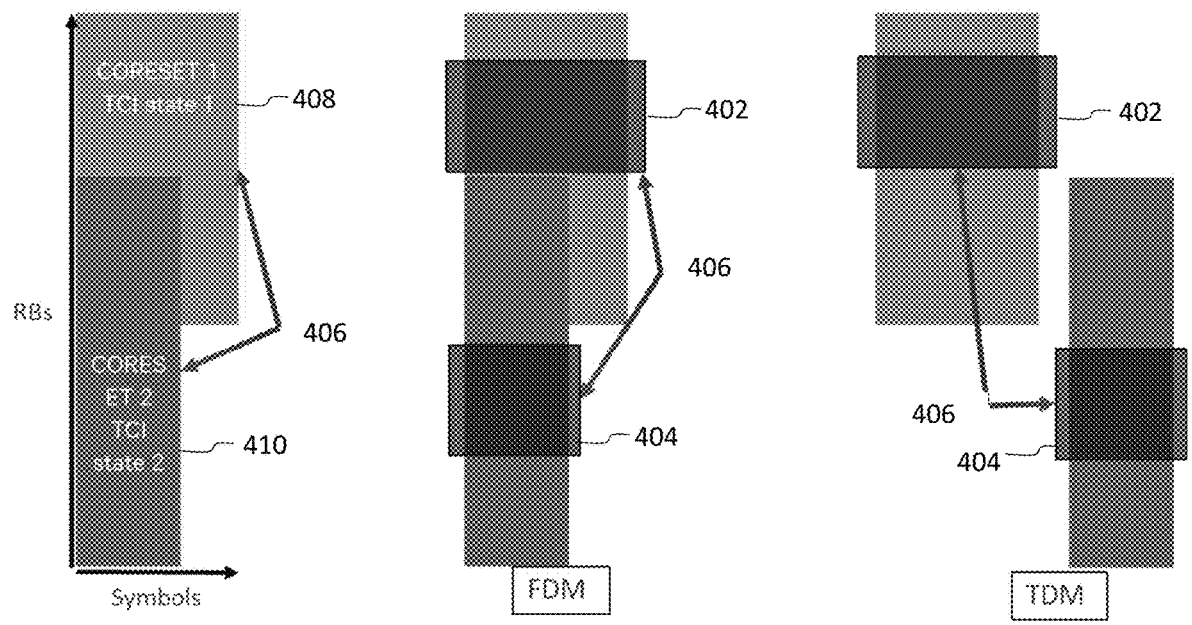
FIG. 4 is a diagram illustrating PDCCHs according to the 1SS-2CORESET scheme, according to an embodiment.

As an alternative to associating PDCCH candidates with two different TCI states, one SS set may be associated with two different CORESETs, where each CORESET is associated with a TCI state. This scheme is referred to as 1SS-2CORESET scheme. FIG. 4 is a diagram illustrating PDCCHs according to the 1SS-2CORESET scheme, according to an embodiment. A first PDCCH 402 and a second PDCCH 404 of a single SS set 406 are shown in a first CORESET 408 and a second CORESET 410, respectively, for both FDM and TDM.

Figure 5:
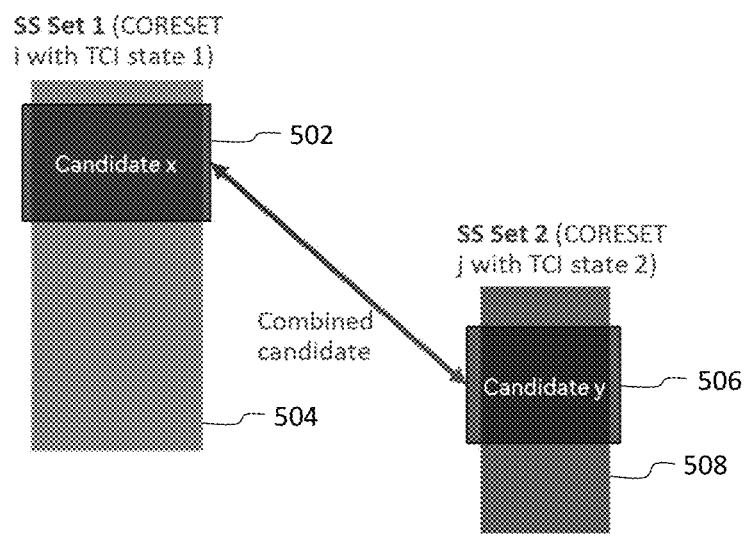
FIG. 5 is a diagram illustrating PDCCHs according to the 2SS-2CORESET scheme, according to an embodiment.

A different SS and CORESET multiplexing scheme is also possible to allow multiple TCI states for PDCCH candidates. With this scheme, referred to as 2SS-2CORESET scheme, two SS sets are associated with two CORESETs, where each CORESET is configured with a different TCI state. FIG. 5 is a diagram illustrating PDCCHs according to the 2SS-2CORESET scheme, according to an embodiment. Specifically, a first PDCCH 502 (candidate x) is from a first SS set and a first CORESET 504 having a first TCI state, while a second PDCCH (candidate y) 506 is from a second SS and a second CORESET 508 having a second TCI state.

While embodiments of the disclosure generally relate to the 1SS-1CORESET scheme, the described methods may be applied to any SS-CORESET multiplexing scheme. The following methods may also be applied to both repetition and multi-chance PDCCHs.

PDCCH Candidate Implicit Linkage

With multi-chance PDCCH, the PDCCH may be linked together implicitly. That is, a UE may not know if the two PDCCHs are linked together prior to decoding (e.g., a UE is not configured via radio resource control (RRC) with multi-chance operation). Only after decoding, the UE can know whether the PDCCHs schedule the same TB or not. Such information is needed for the UE to generate one set of ACK/NACK bits for all the scheduled PDSCHs.

In a first method with multi-chance PDCCH (implicit linkage methods), if the UE is configured to operate with multi-TCI PDCCH transmission by multi-TRP, and a multi-chance PDCCH transmission scheme with no explicit linkage of the PDCCH candidates, any of the following methods can be used to determine if the PDCCHs are linked together.

A) If the UE receives two PDCCHs scheduling one or more PDSCHs such that: 1) the PDCCHs have the same value of hybrid automatic repeat request (HARQ) process number; and 2) the ACK/NACK of the scheduled PDSCH(s) are mapped to the same PUCCH slot or sub-slot, then the PDCCHs are linked together.

B) If the UE receives two PDCCHs in one slot, scheduling one or more PDSCHs such that: 1) the PDCCHs have the same value of FDRA field; and 2) the ACK/NACK of the scheduled PDSCH(s) are mapped to the same PUCCH, then the PDCCHs are linked together.

C) If the UE receives two PDCCHs in one slot, scheduling one or more PDSCHs such that: 1) the PDCCHs have the same value of start and length symbol (SLIV) of the indicated time domain resource assignment (TDRA) row; and 2) the ACK/NACK of the scheduled PDSCH(s) are mapped to the same PUCCH, then the PDCCHs are linked together.

D) If the UE receives two PDCCHs in one slot, scheduling one or more PDSCHs such that: 1) the PDCCHs have the same value new data indicator (NDI); and 2) the ACK/NACK of the scheduled PDSCH(s) are mapped to the same PUCCH, then the PDCCHs are linked together.

E) If the UE receives two PDCCHs scheduling one or more PDSCHs such that: 1) the PDCCHs have the same value of HARQ process number; 2) the PDCCHs have the same value of new data indicator (NDI); and 3) all PDSCHs are received before the end of the earliest PUCCH carrying an ACK/NACK of one or more of the PDSCH(s), then the PDCCHs are linked together. One special case of 3) is when the ACK/

NACK of the scheduled PDSCH(s) are mapped to the same PUCCH slot or sub-slot.

Determining the linkage between multi-chance PDCCHs based on the HARQ process number (HPN) seems a natural choice. However, there are some scenarios where the HPN field in the scheduling DCI is not available and the HPN of the PDSCHs are determined in a different way based on the RRC configurations. For example, a PDCCH may activate a semi-persistent scheduling (SPS) PDSCH configuration where an HPN field is used for validation or determination of which SPS PDSCH configuration is being activated or released.

In a second method with multi-chance PDCCH (implicit linkage methods and SPS PDSCH), if the UE is configured to operate with multi-TCI PDCCH transmission by multi-TRP, and a multi-chance PDCCH transmission scheme with no explicit linkage of the PDCCH candidates, the following method can be used to determine if the PDCCHs are linked together when the PDCCHs are validated to activate a SPS PDSCH configuration.

If the UE receives two PDCCHs scheduling one or more PDSCHs such that: 1) the PDCCHs have the same value of frequency domain resource assignment (FDRA) or TDRA field; and 2) the ACK/NACK of the scheduled PDSCH(s) are mapped to the same PUCCH slot or sub-slot, then the PDCCHs are linked together.

PDCCH Candidate Explicit Linkage

In the case of explicit linkage, the UE will know which PDCCH candidates are linked together prior to decoding.

In the case of repetition, a mapping should be defined so that the UE knows the two PDCCH candidates with different TCI states and the same payload.

In order to combine two different PDCCH candidates efficiently, an association or linkage between different PDCCH candidates needs to be defined. The linkage between PDCCH candidates can be according to one of the following schemes.

Scheme A: Two sets of PDCCH candidates (in a given SS set) are associated with the two TCI states of the CORESET, respectively.

Scheme B: Two sets of PDCCH candidates are associated with two corresponding SS sets, where both SS sets are associated with the CORESET and each SS set is associated with only one TCI state of the CORESET.

The following two methods define the linkage between the PDCCH candidates for the above schemes.

In a first method with PDCCH candidate linkage within an SS set, when two sets of PDCCH candidates (in a given SS set) are associated with the two TCI states of the CORESET, respectively, the PDCCH candidate number i at aggregation level (AL) L is linked to the PDCCH candidate number i+N/2. N is the total number of PDCCH candidates configured in the search space set. The UE may assume that the two TCIs states applicable to the two candidates are different.

In a second method with PDCCH candidate linkage in two different SS sets, when two sets of PDCCH candidates are associated with two corresponding SS sets, where both SS sets are associated with the CORESET and each SS set is associated with only one TCI state of the CORESET, the PDCCH candidate number i in the first SS set is linked to the PDCCH candidate number i in the second SS set.

Figure 6:
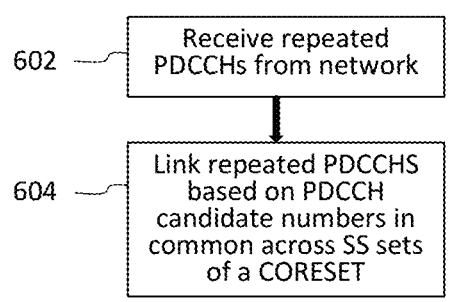
FIG. 6 is a flowchart illustrating a method for explicitly linking repeated PDCCHs by a UE, according to an embodiment.

FIG. 6 is a flowchart illustrating a method for explicitly linking repeated PDCCHs by a UE, according to an embodiment. At 602, the UE receives the repeated PDCCHs from a network. Each of the repeated PDCCHs includes DCI that schedules reception of a same PDSCH at the UE. At 604, the UE links the repeated PDCCHs based on PDCCH candidate numbers that are in common across SS sets of a CORESET. Each repeated PDCCH is associated with a respective one of the SS sets, and each SS set is associated with a respective TCI state of the CORESET. Each repeated PDCCH has a same PDCCH candidate number in a different SS set.

HARQ-ACK Codebook (CB) Aspects

With current definitions of a monitoring occasion (MO) index and/or a downlink assignment indicator (DAI) field, a type-2 CB may result in incorrect payload size as set forth below.

Figure 7:
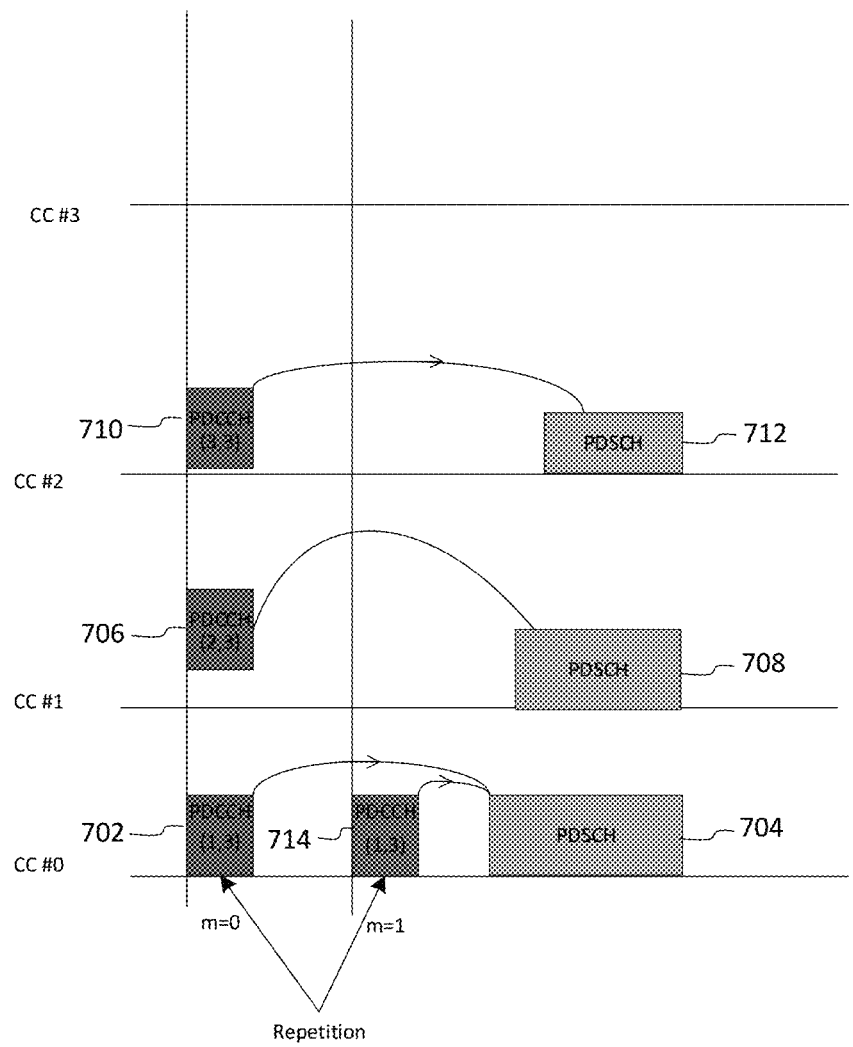
FIG. 7 is a diagram illustrating DAI operation with PDCCH repetition, according to an embodiment.

FIG. 7 is a diagram illustrating DAI operation with PDCCH repetition, according to an embodiment. A first PDCCH 702 is received at MO m=0 in a first component carrier (CC) and schedules a first PDSCH 704. The first PDCCH 702 includes a counter DAI (C-DAI) of 1 and a total DAI (T-DAI) of 3. A second PDCCH 706 is received at m=0 in a second CC and schedules a second PDSCH 708. The second PDCCH 706 includes a C-DAI of 2 and a T-DAI of 3. A third PDCCH 710 is received at m=0 in a third CC and schedules a third PDSCH 712. The third PDCCH 710 includes a C-DAI of 3 and a T-DAI of 3. A repeated first PDCCH 714 is received at m=1 in the first CC and also schedules the first PDSCH 704.

The UE will find the ACK/NACK size to be 7 at m=1 (1 missed DCI from 3 to 1, and 2 missed DCI from C-DAI=1 and T-DAI=3). Therefore, a current Type-2 HARQ-ACK CB or its related parts need to be modified such that the correct payload size is applied.

Regarding the issue of a wrong type-2 HARQ-ACK CB payload size, the general idea to ensure correct payload size is to either implicitly or explicitly indicate to the UE whether to consider the detected DCI participating in the codebook construction.

In a first method with explicit linkage (exclusive pairwise linkage), if the UE is configured to operate with multi-TCI PDCCH transmission by multi-TRP (a PDCCH candidate X is only linked to one other PDCCH candidate Y, for any two linked PDCCH candidate X and PDCCH candidate Y, which schedule a single PDSCH and PDCCH, X ends no later than the end of PDCCH Y):

A) the UE is not expected to be indicated with different values of DAI fields in PDCCH X and PDCCH Y; and B) the UE only applies the value of DAI obtained from any of the two PDCCHs to the MO index corresponding to PDCCH X.

Referring back to FIG. 7, it may be assumed that MOs m=0 and m=1 are in the same slot and the first PDCCH 702 is missed. The UE determines the HARQ-ACK CB payload as if the (1,3) the first repeated PDCCH 714 in m=1 was detected in m=0. At m=1, the first repeated PDCCH 714 is discarded.

Figure 8:
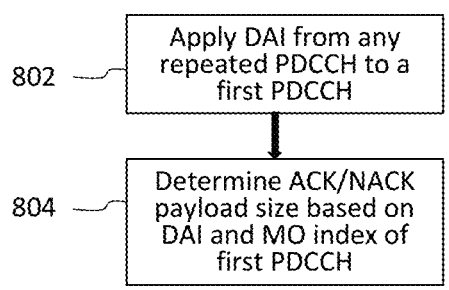
FIG. 8 is a flowchart illustrating a method for determining an acknowledgment/negative acknowledgment (ACK/NACK) payload size for repeated PDCCHs, according to an embodiment.

FIG. 8 is a flowchart illustrating a method for determining an ACK/NACK payload size for repeated PDCCHs, according to an embodiment. At 802, the UE applies a value of a DAI field obtained from any repeated PDCCH to a MO index corresponding to a first PDCCH of the repeated PDCCHs. At 804, the UE determines an ACK/NACK payload size corresponding to the repeated PDCCHs based on the value of the DAI field and the MO index.

Figure 9:
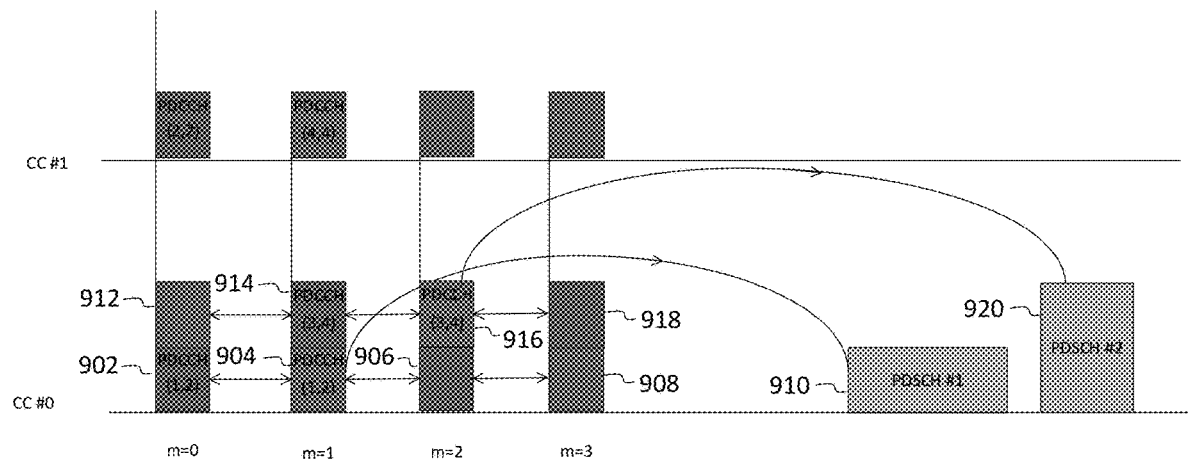
FIG. 9 is a diagram illustrating PDCCH candidates of an SS set, according to an embodiment.

As described in the first method, the proposed solution only works for specific cases in which a PDCCH candidate is only linked to one other candidate. FIG. 9 is a diagram illustrating DAI operation with PDCCH repetition, according to another embodiment. There are four MOs per slot corresponding to four SSs. For simplicity it is assumed that each SS is only configured with two PDCCH candidates.

In a first CC, a first PDCCH 902 is received at m=0, a second PDCCH 904 is received at m=1, a third PDCCH 906 is received at m=2, and fourth PDCCH 908 is received at m=3. The first through fourth PDCCHs 902-908 schedule reception of a first PDSCH 910. Also in the first CC, a fifth PDCH 912 is received at m=0, a second PDCCH 914 is received at m=1, a third PDCCH 916 is received at m=2, and a fourth PDCCH 918 is received at m=3. The fifth through eighth PDCCHs 912-918 schedule reception of a second PDSCH 920. PDCCHs of a second CC are similarly received.

It is possible that the DAI values are applied to any MO in which the PDCCHs are detected. That is, the UE can apply the DAI value to any of the detected repetitions as long as the repetition selection is commonly understood between the UE and the gNB. In case the UE applies the DAI to a non-first repetition, the functionality of DAI should be redefined.

In a second method with explicit linkage (exclusive pairwise linkage), if the UE is configured to operate with multi-TCI PDCCH transmission by multi-TRP (for any M linked PDCCH candidates $X_1$, PDCCH candidate $X_2$, ..., PDCCH candidate $X_M$ where the candidates are sorted in ascending order of their start or end time, and all schedule a single PDSCH):

A) the UE is not expected to be indicated with different values of DAI fields in any two PDCCH candidates; and
B) the UE only applies the value of a DAI obtained from any of the M PDCCHs to the MO index corresponding to PDCCH $X_i$, where i is fixed between UE and network (e.g., the first or the last), or can be RRC configured to the UE.

A DAI definition is with respect to the MO index definition. The PDCCH is assumed to be only transmitted in the MO index corresponding to the candidate $X_i$.

Figure 10:
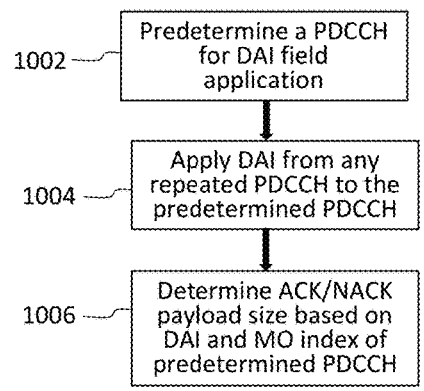
FIG. 10 is a flowchart illustrating a method for determining an ACK/NACK payload size for repeated PDCCHs, according to an embodiment.

FIG. 10 is a flowchart illustrating a method for determining an ACK/NACK payload size for repeated PDCCHs, according to an embodiment. At 1002, the UE predetermines, with the network, a PDCCH from among the repeated PDDCHs for DAI field application. At 1004, the UE applies a value of a DAI field obtained from any of the repeated PDCCHs to an MO index corresponding to the predetermined PDCCH of the repeated PDCCHs. At 1006, the UE determines an ACK/NACK payload size corresponding to the repeated PDCCHs based on the value of the AI field and the MO index.

In the above-described method, there is a pairwise linkage between two MOs. The second PDCCH 904 in m=1 is ignored and the sixth PDCCH 914 in m=1 is moved to the first MO as it is linked to the first MO in addition to the third MO. Moving the sixth PDCCH 914 to the first MO may result in an incorrect payload size depending on which of the (1,2) or (3,4) DCI is applied by UE at this MO. This occurs because the UE incorrectly links the (3,4) DCI to m=0 rather than m=2, because an MO is linked to multiple MOs. To avoid this problem, one DCI field can be introduced to indicate the repetition number. In this case, if any of the PDCCHs among the restitutions are detected by UE, the MO corresponding to the first repetition is determined and the UE applies the detected DAI field to that MO.

In a third method with an explicit DCI field indicating a repetition number, if the UE is configured to operate with multi-TCI PDCCH transmission by multi-TRP, a new DCI field is configured that indicates the repetition number among L PDCCHs scheduling the same PDSCH. The PDCCHs are numbered in ascending order of their start/end time. If the UE detects any PDCCH among the L PDCCHs, it determines the MO corresponding to the MO index corresponding to i-th repetition, where i is fixed between the UE and the network (e.g., the first or the last), or can be RRC configured to the UE and applies the detected DAI values to that MO. That is, a detected PDCCH is assumed to have been detected in the MO index corresponding to the i-th repetition and all other PDCCHs are discarded for the purpose of type-2 HARQ-ACK CB.

Prioritization of PDCCH Reception: TCI State Aspects

In 3GPP Rel-15/16, for different channels overlapping in time domain, there are procedures for the UE to determine channels to receive by certain prioritization rules. Once the UE determines a channel to receive, it will also determine all of the overlapping channels with the same TCI state to receive. With multi-TRP PDCCH schemes, a PDCCH candidate may be configured to be transmitted with two different TCI states each corresponding to a specific TRP. In this case, the definition of the "same TCI state" needs to be clarified.

In 3GPP Rel-15/16, when the UE is configured with single cell operation or for intra-band CA, when UE monitors the PDCCH in one or multiple CORESETs on the same set of OFDM symbols, where the CORESETs are configured with TCI states with QCL-Type set to "typeD', the UE monitors PDCCH candidates in specific CORESETs and all the other CORESETs with the same value of QCL-Type.

The legacy rule is mainly suitable for when the CORESET/PDCCH candidates are configured with a single TCI state. In case of multiple TCI states, CORESET #1 may be configured with a TCI state pair with QCL-typeD pair ($a_1$, $b_1$) and CORESET #2 may be configured with a TCI state pair with QCL-typeD pair ($a_2$, $b_2$). In this case, specific rules are needed to determine if the two CORESETs can be categorized to have the same TCI states for the purpose of PDCCH prioritization.

Figure 11:
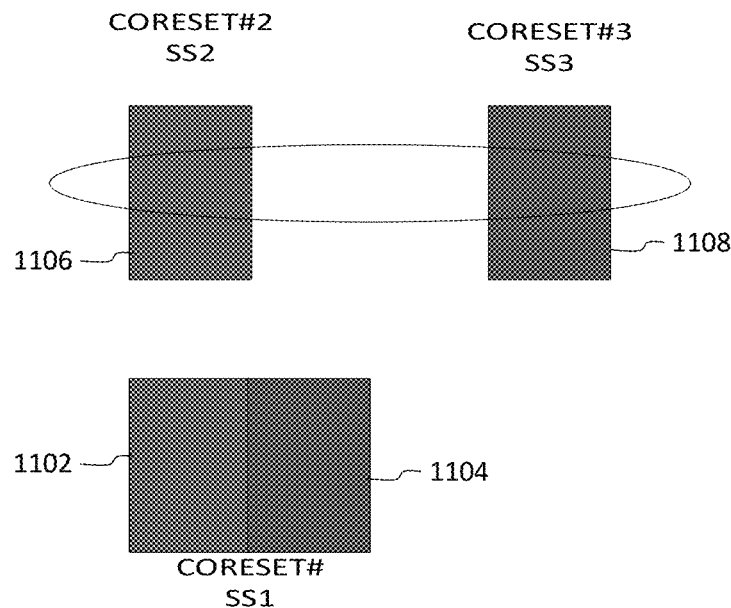
FIG. 11 is a diagram illustrating CORESETs, according to an embodiment.

FIG. 11 is a diagram illustrating CORESETs, according to an embodiment. First and second PDCCHs 1102 and 1104 are in a first CORESET 1102 and a first SS set and associated with two different TCI states. A third PDCCH 1106 is in a second CORESET and a second SS and a fourth PDDCH 1108 is in a third CORESET and a third SS. The second and third CORESETs are explicitly linked. The UE should be able to receive all PDCCH candidates in all shown CORESETs.

With an SFN-based PDCCH enhancement scheme, a CORESET is associated with two different TCI states and a PDCCH is transmitted with one transmission layer (one demodulation reference signal (DMRS) port) such that the DMRS port is associated with two different TCI states of the CORESET. A given PDCCH is then associated with a TCI state pair with QCL-typeD pair ($\alpha_i$, $b_i$)

In a first method with a CORESET prioritization rule for SFN-based PDCCH, if the UE operates in single cell or intra-band carrier aggregation (CA) and is configured with multi-TRP SFN PDCCH, the UE applies the legacy rule to determine the CORESETs to monitor with the following modification (a CORSET #i is configured with a TCI state pair with QCL-typeD pair ($\alpha_i$, $b_i$)).

When the UE determines the CORESET with a common SS (CSS) or a UE specific SS (US S), for the sake of determination of other CORESETs with the same QCL-typeD, a CORESET #1 is considered to have the same QCL-typeD as CORESET #2 if their corresponding QCL-typeD pairs are the same, i.e. ($\alpha_1$, $b_1$)=($\alpha_2$, $b_2$).

A different PDCCH scheme is when every PDCCH candidates of a CORESET are transmitted with two different TCI states in a TDM manner, and the CORESET is configured with two different TCI states with the corresponding ($\alpha_i$, $b_i$).

Thus, in a second method with a CORESET prioritization rule for TDM PDCCH, if the UE operates in single cell or intra-band CA and is configured with multi-TRP TDM PDCCH within one PDCCH candidate of the CORESET, the UE applies the legacy rule to determine the CORESETs to monitor with the following modification (a CORSET #i is configured with a TCI state pair with QCL-typeD pair).

When the UE determines the first CORESET with CSS or the USS, for the sake of determination of other CORESETs with the same QCL-typeD, a CORESET #1 is considered to have the same QCL-typeD as CORESET #2 if for every OFDM symbol on which UE monitors both CORESETs the QCL-typeD values of the PDCCH candidates of the two CORESETs are the same.

If CORESET #1 is chosen as the first monitored CORESET, a CORESET #2 is considered to have the same QCL-typeD as CORESET #1. This is because at every overlapping OFDM symbol, the QCL-typeD values of the PDCCH candidates of the two CORESETs are the same.

Figure 12:
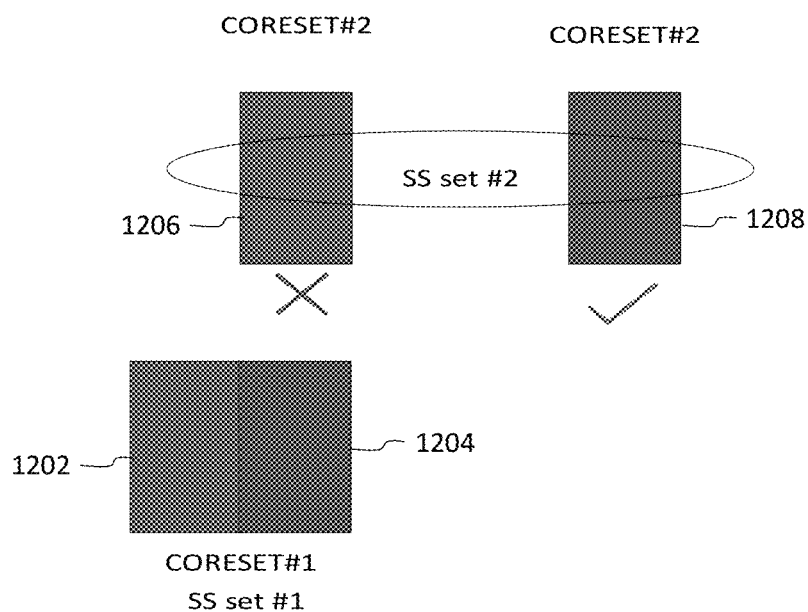
FIG. 12 is a diagram illustrating PDCCH candidates of an SS set, according to an embodiment.

A different PDCCH scheme is when the PDCCH candidates are linked together in the same or different SS sets. FIG. 12 is a diagram illustrating PDCCH candidates of an SS set, according to an embodiment. First and second PDCCHs 1202 and 1204 are in a first CORESET and a first SS set. A third PDCCH 1206 is in a second CORESET and a second SS set. A fourth PDCCH 1208 is in a second COREST and a second SS set. PDCCH candidates of the second SS set are associated with the second CORESET such that a certain number of candidates are associated with the first QCL-typeD value of the CORESET and certain other candidates are associated with the second QCL-typeD value of the CORESET.

Assuming that the first CORSET is chosen to be monitored according to the legacy rule, the second CORESET may be considered to be partially monitored by the UE as certain candidates of the second CORESET do not overlap with those of the first CORESET with different QCL-typeD values. The following method is a conservative approach in which the UE does not monitor any candidates of the CORESET #2 in FIG. 12, even though some may not experience a QCL-typeD collision.

In a third method with a CORESET prioritization rule for TDM PDCCH (linked PDDCH candidates), if the UE operates in single cell or intra-band CA and is configured with multi-TRP TDM PDCCH, where the SS sets and the PDCCH candidates are linked together as repetition or multi-chance in a TDM scheme associated with the same CORESET, the UE applies the legacy rule to determine the CORESETs to monitor with the following modification (CORSET #i is configured with a TCI state pair with qcl-typeD pair).

When the UE determines the first CORESET with CSS or the USS, for the sake of determination of other CORESETs with the same QCL-typeD, a CORESET #1 is considered to have the same QCL-typeD as CORESET #2 if for every OFDM symbol on which UE monitors both CORESETs the QCL-typeD values of the PDCCH candidates of the two CORESETs are the same.

The above-described methods result in full dropping of a CORESET (SS) if any of its PDCCH candidates have a different QCL-typeD value on a symbol that overlaps with the first CORESET. Such schemes may unnecessarily drop the whole SS or CORESET even though the UE is capable of receiving some PDCCH candidates within them. For example, the UE can monitor the PDCCH in the second set of candidates of CORESET #1. This line of behavior can be realized by partial dropping of CORESETs.

In a fourth method with a general CORESET prioritization rule (partial monitoring: PDCCH candidate granularity: time domain (TD) overlapping), if the UE operates in single cell or intra-band CA and is configured with any of the multi-TRP PDCCH schemes, the UE applies the legacy rule to determine the CORESETs to monitor with the following modification.

When the UE determines the first CORESET with CSS or the USS, for the sake of determination of other CORESETs with the same QCL-typeD, the UE monitors PDCCH candidates in SS sets corresponding to the second CORESET if the PDCCH candidate of the second CORESET does not overlap in time with any PDCCH candidate of the first CORESET, such that the two candidates are associated with two different values QCL-typeD on the same symbol.

Technically, the UE may still be able to monitor two different PDCCH candidates from the two CORESETs if the two candidates have the same QCL-typeD on the overlapping resource elements (REs). The following method defines UE behavior based on this approach.

In a fifth method with a general CORESET prioritization rule (partial monitoring: PDCCH candidate granularity: TD and frequency domain (FD) overlapping), if the UE operates in single cell or intra-band CA and is configured with any of the multi-TRP PDCCH schemes, the UE applies the legacy rule to determine the CORESETs to monitor with the following modification.

When the UE determines the first CORESET with CSS or the USS, for the sake of determination of other CORESETs with the same QCL-typeD, the UE monitors PDCCH candidates in SS sets corresponding to the second CORESET if the PDCCH candidate of the second CORESET does not overlap with any PDCCH candidate of the first CORESET in both time and frequency domain, such that the two candidates are associated with two different values of QCL-typeD on same REs.

The fourth and fifth methods describe PDCCH monitoring in the second CORESET on a PDCCH candidate level (i.e., the UE may monitor some PDCCH candidates in the second COREST and not monitor some others). Monitoring may also be defined on a CORESTE level, as described in the methods below.

In a sixth method with a general CORESET prioritization rule (CORESET level granularity: TD overlapping), if the UE operates in single cell or intra-band CA and is configured with any of the multi-TRP PDCCH schemes, the UE applies the legacy rule to determine the CORESETs to monitor with the following modification.

When the UE determines the first CORESET with CSS or the USS, for the sake of determination of other CORESETs with the same QCL-typeD, the UE monitors PDCCH candidates in SS sets corresponding to the second CORESET if for every two PDCCH candidate #1 from the first CORESET and PDCCH candidate #2 from the second CORESET, the two candidates do not overlap in time with two different values of QCL-typeD on the same symbols.

In a seventh method with a general CORESET prioritization rule (CORESET level granularity: TD and FD overlapping), if the UE operates in single cell or intra-band CA and is configured with any of the multi-TRP PDCCH schemes, the UE applies the legacy rule to determine the CORESETs to monitor with the following modification.

When the UE determines the first CORESET with CSS or the USS, for the sake of determination of other CORESETs with the same QCL-typeD, the UE monitors PDCCH candidates in SS sets corresponding to the second CORESET if for every two PDCCH candidate #1 from the first CORESET and PDCCH candidate #2 from the second CORESET, the two candidates do not overlap in both time or frequency with two different values of QCL-typeD on the same REs.

Prioritization of Type-1 PDCCH Over Type-0/0A/2/3 or PDSCH with Different QCL-Type D Value In 3GPP Rel-15/16, a different prioritization rule exists when UE monitors Type1. The following rule, referred to as legacy "Type1 CSS rule" defines the UE behavior.

For single cell operation or for operation with carrier aggregation in a same frequency band, a UE does not expect to monitor a PDCCH in a Type0/0A/2/3-PDCCH CSS set or in a USS set if a DMRS for monitoring a PDCCH in a Type1-PDCCH CSS set is not configured with same qcl-Type set to 'typeD' properties with a DMRS for monitoring the PDCCH in the Type0/0A/2/3-PDCCH CSS set or in the USS set, and if the PDCCH or an associated PDSCH overlaps in at least one symbol with a PDCCH the UE monitors in a Type1-PDCCH CSS set or with an associated PDSCH.

In a first method with a new type-1 CSS rule (PDCCH collisions: TD overlapping), if the UE operates in single cell or intra-band CA and is configured with any of the multi-TRP PDCCH schemes, and if the UE is configured to receive a first PDCCH in Type-1 CSS and a second PDCCH in Type-0/0A/2/3 CSS or in a USS, the UE does not expect to monitor the second PDCCH candidate if the second PDCCH overlaps in time with the first PDCCH on a symbol such that the QCL-typeD value of the two PDCCHs are different on the symbol. The PDCCHs may be associated with one or two different TCI states.

A UE may be capable of monitoring two PDCCH candidates on the same set of REs as long as the two candidates are not associated with two different QCL-typeD values on same REs.

In a second method with a new Type-1 CSS rule (PDCCH collisions: TD and FD overlapping), if the UE operates in single cell or intra-band CA and is configured with any of the multi-TRP PDCCH schemes, and if the UE is configured to receive a first PDCCH in Type-1 CSS and a second PDCCH in Type-0/0A/2/3 CSS or in a USS, the UE does not expect to monitor the second PDCCH candidate if the second PDCCH overlaps in both time and frequency with the first PDCCH with two different values of QCL-typeD on the same REs. The PDCCHs may be associated with one or two different TCI states.

A similar prioritization rule may be specified for the case of PDSCH collision with Type-1 CSS.

In a third method with a new Type-1 CSS rule (PDSCH collisions: TD overlapping), if the UE operates in single cell or intra-band CA and is configured with any of the multi-TRP PDCCH schemes, and if the UE is configured to receive a PDCCH in Type-1 CSS and is scheduled to receive a downlink grant (DG) PDSCH or configured to receive a SPS PDSCH, the UE does not expect to receive the PDSCH if the PDSCH overlaps in time with the PDCCH on a symbol such that the QCL-typeD value of the PDCCH and the PDSCH are different on the symbol. The PDCCH or PDSCH may be associated with one or two different TCI states.

The third method allows for simultaneous reception of the PDSCH and the PDCCH if the PDSCH is configured with two different TCI states and the PDCCH is configured with one TCI state.

The UE may still be able to monitor a PDCCH candidate and a PDSCH candidate when the two candidates have the same QCL-typeD on the overlapping REs. The following method defines UE behavior based on this approach.

In a fourth method with a new Type-1 CSS rule (PDSCH collisions: TD and FD overlapping), if the UE operates in single cell or intra-band CA and is configured with any of the multi-TRP PDCCH schemes, and if the UE is configured to receive a PDCCH in Type1 CSS and is scheduled to receive a DG PDSCH or is configured to receive a SPS PDSCH, the UE does not expect to receive the PDSCH if it overlaps in both time and frequency with the PDCCH such that the QCL-typeD value of the PDCCH and the PDSCH are different on same REs. The PDCCH or PDSCH may be associated with one or two different TCI states.

PDCCH Overbooking/Dropping Aspects

Overbooking refers to a configuration of search spaces with a number of PDCCH candidates that results in a number of blind decoding (BD) of PDCCH candidates or monitoring of non-overlapping CCEs (BD/CCE), which is larger than the BD/CCE limit per slot. In case of overbooking in a slot, the UE selectively drops some search spaces, such that the total number of PDCCH candidates and CCEs remains within the per-slot limit. $M^{slot}$ and $C^{slot}$ are BD and CCE limit per slot. If the configuration of CSS result in $M_{CSS}$ and $C_{CSS}$ BD and CCE monitoring per slot, there remains $M^{slot}-M_{CSS}$ PDCCH candidates (BDs) and $C^{slot}-C_{CSS}$ CCEs to monitor in all the configured USSs. The UE then drops the USS, if necessary, prioritizing the monitoring of a USS with a lowest configuration index over one with a larger index until either a total number of allocated PDCCH candidates exceeds the BD limit or a total number of allocated CCEs for monitoring exceeds the CCE limit.

In 3GPP Rel-17, the candidates of two USS can be explicitly linked to each other across different SS sets or within the same SS set, when the UE is configured to receive PDCCH repetition schemes. Since the PDCCH candidates are repeated, it may be possible to enhance the overbooking/dropping rules as follows. If the candidates are linked within a SS set, even if including the entire set results in exceeding the limit, partially monitoring the candidates of the set can be useful as some of them are repetition of the others and may not necessarily result in a decoding failure if not decoded in combination with their linked candidates.

When the repetition is across two SS sets, every candidate of the first set is linked to a specific candidate of the second set. In this case, it may be desired to either keep the two linked SSs together or drop them both. Alternatively, when an SS is allocated to be monitored, its linked SS should also be allocated regardless of its SS index.

The methods provided below define SS dropping rules.

In a first method with repetition across SS sets, when the UE is configured with 3GPP Rel-17 PDCCH repetition schemes, the SS dropping rule in 3GPP Rel-15 is modified as below.

When a first SS with a lowest configuration index is selected to be allocated for monitoring, if the SS is linked to a second SS, the second SS is also considered to be allocated regardless of its configuration index. If the allocation of these two sets does not result in exceeding the BD/CEE limit, they are both allocated. If allocation of the first SS does not result in exceeding the limit but allocation of both does, the second SS is dropped. If allocation of the first SS results in exceeding the limit, both SSs are dropped.

It may be assumed that the PDCCH repetition is within a SS set with N candidates numbered #1 to #N, and PDCCH candidate #i is linked to candidate #i+N/2 for i=1, . . . , N/2 and N even. If the set is selected to be allocated and it results in exceeding the BD/CCE limit, an enhanced scheme can be provided to see if monitoring half of the candidates, e.g. #1, . . . , N/2 exceeds the limit. If it does not, the UE monitors only those candidates in the SS.

In a second method with repetition within SS sets, when the UE is configured with 3GPP Rel-17 PDCCH repetition schemes, the SS dropping rule in 3GPP Rel-15 is modified as below.

When an SS with a lowest configuration index is selected to be allocated for monitoring, and a first set A of candidates within the SS is linked to a second set B of candidates within the SS: if the allocation of all of the candidates in A and B does not results in exceeding the BD/CEE limit, the SS is allocated and all candidates in A and B are monitored; if the allocation of all of the candidates in A and B result in exceeding the limit but allocation of all the candidates in A (B) does not result in exceeding the limit, the SS is partially allocated (i.e., only the candidates in A (B) are allocated); and if the allocation of all the candidates in A (B) results in exceeding the limit, the SS is fully dropped.

REG Association to the TCI States

In a scheme in which one CORESET is associated with two different TCI states and one PDCCH candidate is associated with two different TCI states, if a current formula for determining the PDCCH candidates is used unaltered, it may not guarantee that PDCCH candidates with different aggregation levels have an equal portion of REGs with two TCI states unless a specific association of REGs or CCEs to the TCI state is assumed. Two different aggregation levels are configured for a given SS.

Figure 13:
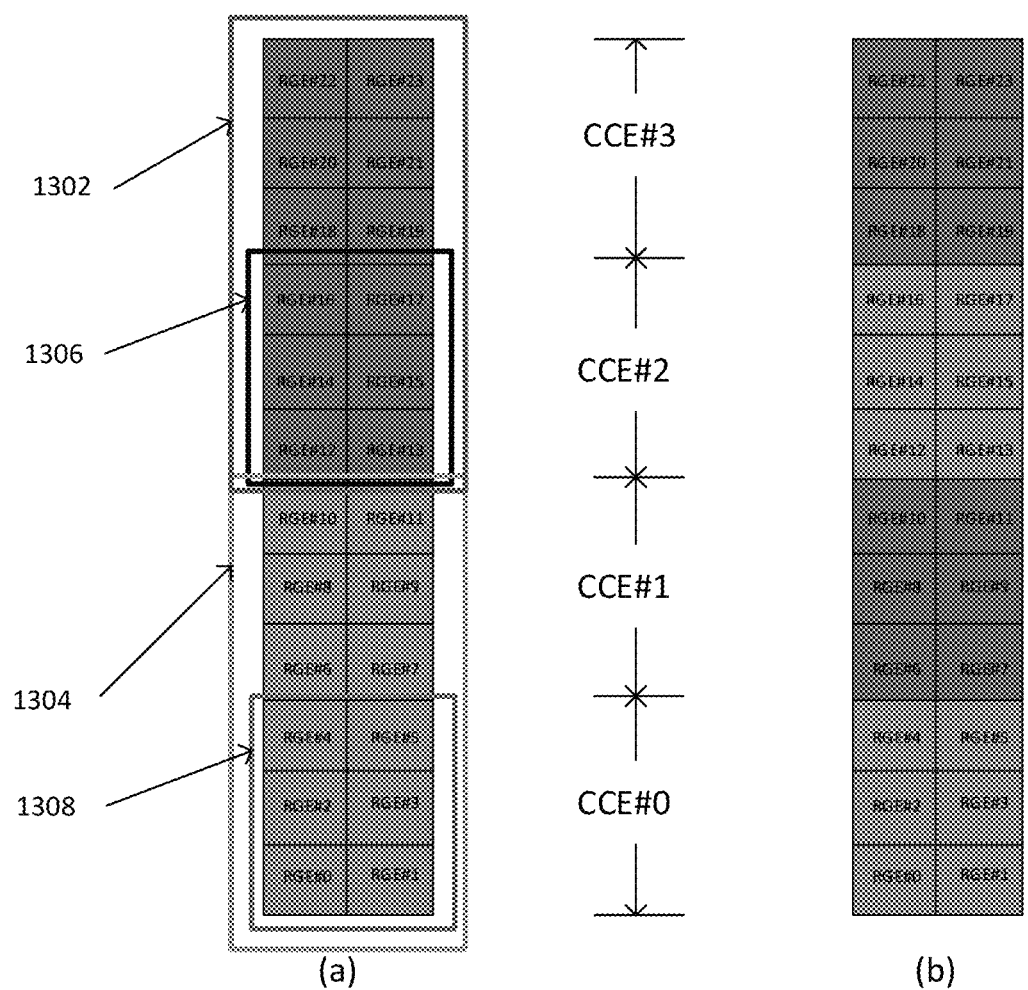
FIG. 13 is a diagram illustrating REG to TCI state mapping, according to an embodiment.

FIG. 13 is a diagram illustrating REG to TCI state mapping according to an embodiment. If the association to the TCI states is according to (a), then a first PDCCH 1302 or a second PDCCH 1304 with aggregation level (AL)=2, does not have REGs with both TCI states. A third PDCCH 1306 and a fourth PDCCH 1308 have an AL=1. However, if the REG-to-TCI-state mapping is according to (b), corresponding first and second PDCCH candidates will have two different TCI states (i.e., a first half of the REGs in the candidate are associated with the first TCI state and the other half are associated with different TCI state).

A similar issue exists when a PDCCH candidate is associated with two TCI states when a TDM scheme is employed. In particular, if the CORESET length is 1 or 3, then it is impossible to have a PDCCH candidate with an equal number of REGs for different TCI states.

In a scheme in which one CORESET is associated with two different TCI states and one PDCCH candidate is associated with two different TCI states, it needs to be ensured that a PDCCH candidate at any AL has two sets of REGs, each associated with one of the two TCI states.

In a first method in which every CCE has two TCI states ((3,3) distribution), the set of REGs are mapped to the TCI states such that in every CCE, there are a first three REGs associated with the first TCI state and a second three REGs associated with the second TCI state.

Figure 14:
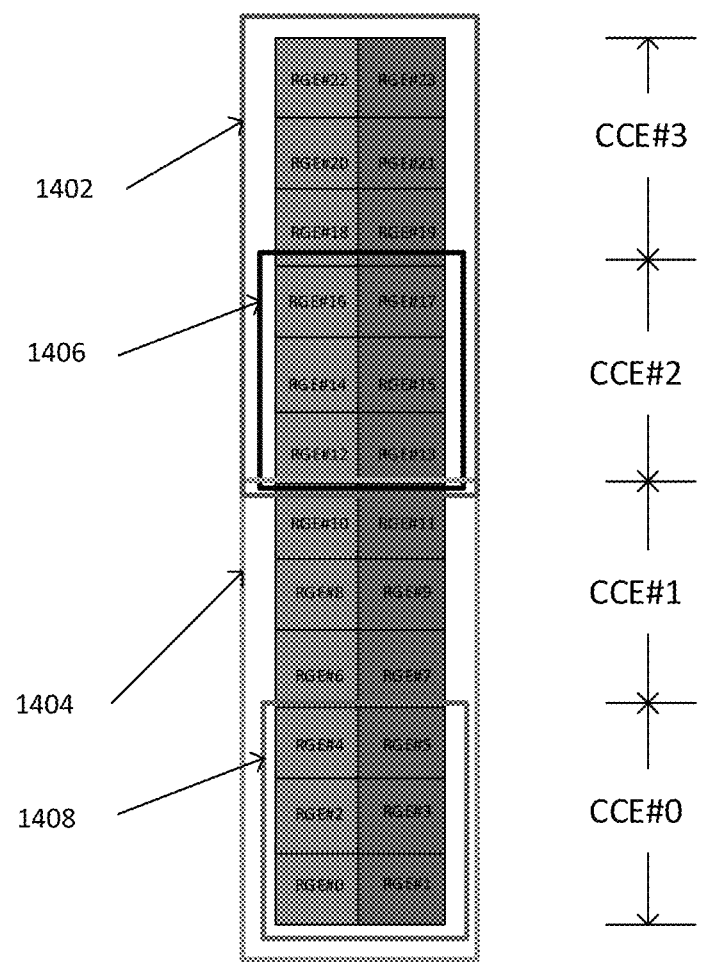
FIG. 14 is a diagram illustrating REGs mapped to TCI states, according to another embodiment.

FIG. 14 is a diagram illustrating REGs mapped to TCI states, according to another embodiment. Each of the first through fourth CCEs includes three REGs of a first TCI state and three REGs of a second TCI state. First and second PDCCHs 1402 and 1404, having AL=2, include six REGs of each TCI state. Third and fourth PDCCHs 1406 and 1408 (AL=1) include three REGs of each TCI state.

Figure 15:
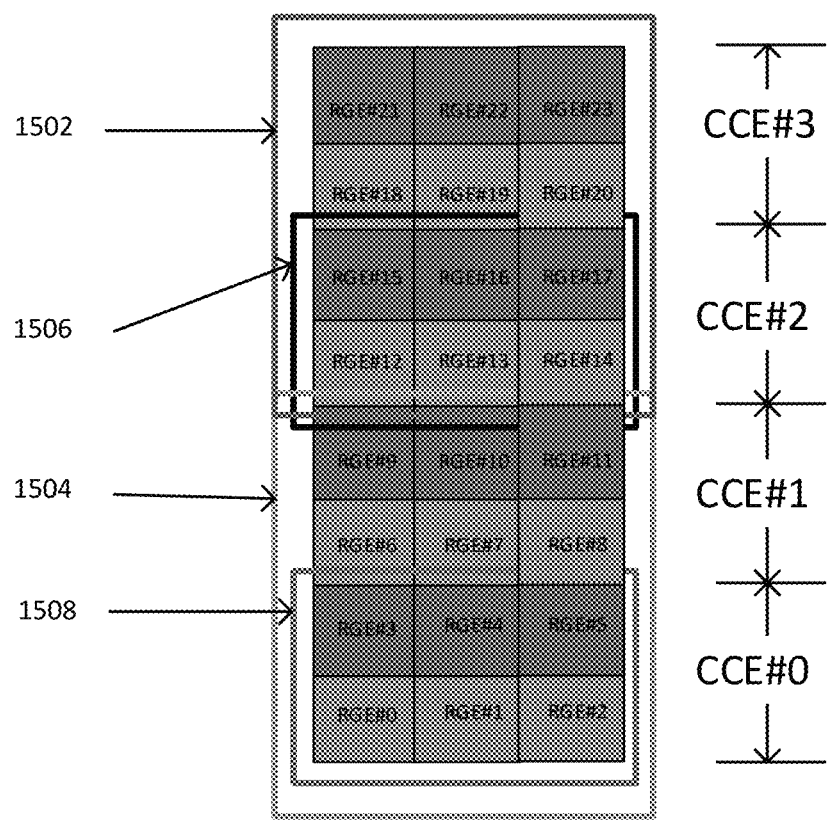
FIG. 15 is a diagram illustrating REGs mapped to TCI states, according to another embodiment.

FIG. 15 is a diagram illustrating REGs mapped to TCI states, according to another embodiment. Each of the first through fourth CCEs includes three REGs of a first TCI state and three REGs of a second TCI state. First and second PDCCHs 1502 and 1504, having AL=2, include six REGs of each TCI state. Third and fourth PDCCHs 1506 and 1508 (AL=1) include three REGs of each TCI state.

Although an equal distribution of the two TCI states in PDCCH candidates, or CORESET, seems to be the natural choice with smallest effort, it may not always be feasible. For example, in case of TDM and a CORESET length of 3, it is not possible to have a CCE with 3 REG of the first TCI state and 3 REG of the second TCI state. Therefore, it may be needed to specify other REG association to the TCI states. Alternatively, it may not be supported to have a TDM scheme with length-1 or length-3 CORESETs.

In a second method in which every CCE has two TCI states ((a, b) distribution α+b=6), the set of REGs are mapped to the TCI states such that in every CCE, there are a first a REGs associated with the first TCI state and a second b REGs associated with the second TCI state (α+b=6).

Figure 16:
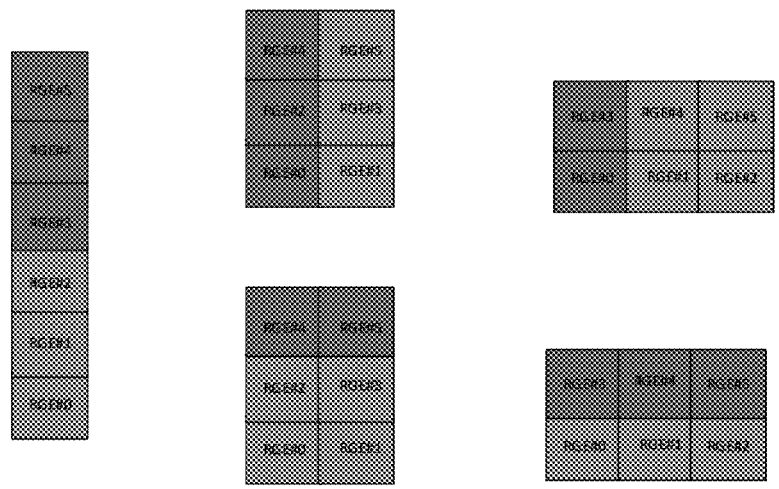
FIG. 16 is a diagram illustrating supported REG-to-TCI states association patterns, according to an embodiment.

FIG. 16 is a diagram illustrating supported REG-to-TCI states association patterns, according to an embodiment. The network configures the UE with the REG-to-TCI-state association (pattern) for a CCE.

The UE does not expect to be configured with a REG-to-TCI-state association pattern such that it includes both FDM and TDM. In other words, an REG-to-TCI-state association pattern is supported if for every CCE either: for any OFDM symbol, all REGs are associated with the same TCI state; or all the REGs on the same set of 12 subcarriers are associated with the same TCI-state.

In a third method in which a TDM scheme is only applicable to a length-2 CORESET, the UE does not expect to be configured with a TDM scheme for multi-TRP PDCCH transmission, where the length of the CORESET is either 1 or 3.

A different solution may also be employed where the set of CCEs or REGs or PDCCH candidates are divided into two sets. Each set is associated with a different TCI state. In case of CCE, for each aggregation level greater than or equal to two, the first $$\frac{L}{2}$$

CCEs corresponding to the PDCCH candidates are determined according to the function in TS 38.213. The second L/2 CCEs for the candidates are then chosen from the second set.

In a fourth method with two sets of CCEs, the set of CCEs is divided into two sets, where the first set is associated with the first TCI state and the second set is associated with the second TCI state. There is a one-to-one mapping between a CCE from the first set and CCE from the second set. For a PDCCH candidate at aggregation level L≥2, a CCE determining function is used to determine the first $$\frac{L}{2}$$

CCE. The second $$\frac{L}{2}$$

CCEs of the candidate is obtained from the second set according to the mapping.

The association between the TCI states can also be defined on the REG level. REGs of a CORESET are divided into two sets, each associated with one TCI state.

In a fifth method with two sets of REGs, the set of REGs in a CORESET is divided into two sets where the first set is associated with the first TCI state and the second set is associated with the second TCI state. There is a one-to-one mapping between an REG from the first set and an REG from the second set. For a PDCCH candidate at aggregation level L≥2, includes Z REGs from the first set and 6L-Z REGs from the second set, where the association between the REGs can be based on the REG number.

3GPP Rel-15 and Rel-17 PDCCH candidates may coexist on a given SS. While for an SS with only Rel-17 candidates, an REG-to-TCI-state mapping may be configured to the UE, further introduction of Rel-15 candidates in the same SS can increase the signaling overhead as well as UE implementation complexity. With the mixed Rel-15 and Rel-17 candidates on the same SS, the UE will need to apply selective spatial filter on different candidates depending on whether they are Rel-15 or Rel-17. This can increase UE implementation complexity compared to the case where all the candidates are Rel-15, i.e. with single TCI state or Rel-17 with two different TCI states.

In a sixth method with the coexistence of candidates not allowed in one SS, when a UE is configured with a SS, it is only supported to have one of the following two cases: every PDCCH candidate in the SS is Rel-15 candidate (i.e., is associated with only one single TCI state); or every PDCCH candidate in the SS is Rel-17 candidate (i.e., is associated with two different TCI states).

It is also possible to have both Rel-15 (one TCI state) and Rel-17 (two TCI states) PDCCH candidates in one SS set.

In a seventh method with the coexistence of 3GPP Rel-15 and Rel-17 candidates allowed in one SS, when a UE is configured with a SS, it is supported to have both Rel-15 PDCCH candidates and Rel-17 PDCCH candidates, where a Rel-15 candidate is defined as a candidate with a single TCI state, while a Rel-17 candidate is defined as a candidate with two different TCI states. In this case, one of TCI states may always be equal to the TCI state of rel-15 candidate. Otherwise, there can be total of 3 TCI states in the SS. When no TCI state has QCL-TypeD or when all TCI states have the same QCL-TypeD, all PDCCH candidates can be monitored simultaneously. The following are possible schemes.

Scheme 1) Every candidate may be associated with any of the TCI states. Due to a different TCI state, a UE may need to perform separate channel estimation for each TCI state assumption as well as separate demodulation and decoding. In this case, to determine BD/CCE limit and counting, each candidate and CCE is counted twice to acknowledge two assumptions of Rel-15 and Rel-17. Alternatively, they may be counted as (1+γ) times for the increased processing burden, where γ is either fixed or determined based on UE capability.

According to some embodiments in this invention, one SS may contain more than one TCI state. In this case, some CCEs may have the same TCI state for Rel-15 and Rel-17 assumptions while some CCEs may not. In this case, each CCE may be counted twice or (1+γ) times only for those CCEs having different TCI state assumption between Rel-15 and Rel-17.

Scheme 2) The set of PDCCH candidates at an aggregation level, are divided into two sets, where the first set only contains the Rel-15 candidates and second set only contains Rel-17 candidates. The candidates are associated to the two sets based on the candidate number.

One may think about the possibility of having two SSs associated with the same CORESET such that the candidates of the first SS are Rel-15 and the candidates of the second SS are Rel-17. In this case, if a PDCCH candidate from the first SS overlaps with a candidate from the second SS, application of the spatial filter may be challenging to the UE. Moreover, when two SSs both entirely with Rel-17 candidates have overlapping candidates, the TCI states for the overlapping CCEs should match each other on the QCL-D value.

The QCL property is effectively used in NR to assist the UE with applying the proper spatial filter for a transmission/reception beam as well as other properties of the channel a UE may employ to enhance the signal/channel processing.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a QCL relationship between one or two downlink reference signals and the DMRS ports of the PDSCH, the DMRS port of PDCCH or the channel state information (CSI)-RS port(s) of a CSI-RS resource. The quasi co-location relationship is configured by the higher layer parameter qcl-Type1 for the first downlink (DL) RS, and qcl-Type2 for the second DL RS (if configured). For the case of two DL RSs, the QCL types shall not be the same, regardless of whether the references are to the same DL RS or different DL RSs. The QCL types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command, as described in TS 38.321, used to map up to 8 TCI states to the codepoints of the DCI field 'Transmission Configuration Indication' in one CC/DL BWP or in a set of CCs/DL BWPs, respectively. When a set of TCI state IDs are activated for a set of CCs/DL BWPs, where the applicable list of CCs is determined by indicated CC in the activation command, the same set of TCI state IDs are applied for all DL BWPs in the indicated CCs.

In an eighth method with coexistence of Rel-15 and Rel-17 candidates (inter-SS behavior), when a UE is configured with two search spaces with Rel-17 candidates with the same CORESET, the UE does not expect to be configured with the search spaces such that any REG at any symbol in slot is associated to the one TCI-state according to the first SS and to the other TCI state according to the second SS. One of the two following possibilities are considered.

A) The main bullet is only applicable when two TCI states have different QCL-D types.
B) The main bullet is applicable when any QCL type is different between the two TCI states.

According to a ninth method, for single cell operation or intra-band carrier aggregation, when the UE is configured with one or more search spaces associated with one CORESET with two different TCI states with two different QCL-TypeD properties, and if the set of PDCCH candidates from a first SS or CORESET overlap with the set of PDCCH candidates from the second SS or CORESET such that there is at least one REG with two different QCL-TypeD properties defined by the first and second TCI states, the UE only monitors the PDCCHs in one of the two SS determined according to the following prioritization rule.

A) CSS is prioritized over USS. With multiple CSSs, the CSS with the lowest SS index on the cell with lowest serving cell index is selected.

B) If none of the two SSs are a CSS, the USS with the lowest SS index on the cell with smallest serving cell index is selected.

According to some embodiments, one SS may contain more than one TCI state. In this case, determination of different QCL-TypeD for application of prioritization can be done separately for each region of the SS corresponding to each TCI state. Then, a UE may not monitor an SS unless all regions in the SS can be monitored.

For any two SSs, if the set of PDCCHs from the first SS do not overlap with the set of PDCCHs from the second SS, or the two sets overlap but there is not any overlapping REG with two different QCL-TypeD properties determined from the first and second TCI states, the UE monitors the PDCCHs in both SSs.

According to this method, if two TCI states have different QCL-TypeD properties: If SS #0 is USS and SS #1 is CSS, the UE only monitors PDCCH in SS #1; If both SS are USS, the UE only monitors PDCCHs in SS #0 (assuming it has the lowest SS index).

If the two TCI states have the same QCL-TypeD properties, the UE monitors the PDCCH in both SSs. In the current 5G specification, CCE and candidate are not counted multiple times if multiple SSs with one CORESET fully overlap since each CORESET can have only one TCI state. However, in some embodiments, different SSs with one CORESET can have different TCI states. In this case, a UE may need to perform separate channel estimation for each TCI state assumption as well as separate demodulation and decoding. Hence, CCEs and candidates corresponding to such fully overlapping candidates would still need to be counted separately or $(1+\gamma)$ times if TCI states of those overlapping SS's are different. According to some embodiments, one SS may contain more than one TCI state. In this case, some CCEs may have the same TCI state for Rel-15 and Rel-17 assumptions while some CCEs may not. In this case, each CCE may be counted twice or $(1+\gamma)$ times only for those CCEs having different TCI states BD/CCE Limit Counting Since each PDCCH candidate can be associated to two TCI states, it may be needed to count a candidate more than once towards the BD/CCE limit. In particular, an FDM scheme requires simultaneous reception of two different TCI states, which may increase the PDCCH monitoring complexity. With repetition schemes, soft combining may be used for polar decoding. However, RE de-mapping to combine the log-likelihood ratios (LLRs) may also increase the PDCCH monitoring complexity. With non-repetition schemes, each PDCCH may be counted separately regardless of repetition of the content of the DCI. Overall, PDCCH candidate counting should be revisited to account for multiple TCI states.

As described above, due to multiple TCI states involved in transmission/reception of one PDCCH, how to count the BD/CCE limits may be reconsidered to account for multiple TCI states. In general a PDCCH candidate may be counted as (1+scaling factor) for different cases, as shown below.

| Case | Scaling factor |
| --- | --- |
| Case 1 (no repetition) | Each PDCCH candidates counts as one BD and each CCE counts as $1 + \gamma_1$ CCE |
| Case 2 (repetition) + explicit linkage | Each two PDCCH repetitions count as one BD and each two CCEs in two different repetitions are counted as $2 + 2\gamma_2$ |
| Case 3 (repetition) + no explicit linkage | Each two PDCCH repetitions count as 2 BDs and each two CCEs in two different repetitions are counted as $2 + 2\gamma_3$ |
| Case 4 (multi-chance) | Every two PDCCH repetitions count as 2 BD and each two CCEs count as $2 + 2\gamma_4$. |

According to one solution, for each case the UE reports a scaling factor $1 \leq \gamma \leq 2$ and BD/CCE limits are scaled accordingly. For Case 1, the additional burden due to multi-TCI states, is that UE needs to apply two different spatial filters for the reception of two TCI states. A scaling parameter $\gamma_1$ may be defined to reflect the additional complexity for CCE monitoring. Since one decoding is applied, the BD number should not be scaled.

In a first method with BD/CCE limit for Case 1 (no repetition), for a UE operating with no repetition, each PDCCH candidate is counted as 1 BD and each CCE is counted as $1+\gamma_1$ where $\gamma_1$ is determined according to one of the following alternatives.

- $1 \leq \gamma_1 \leq 2$ is a fixed number set by network for all UEs operating in Case 1.
- $1 \leq \gamma_1 \leq 2$ is determined according to UE capability; and UE reports a value for $\gamma_1$ directly to the network.
- $1 \leq \gamma_1 \leq 2$ is determined according to UE capability; UE reports one or multiple candidate values or bounds for $\gamma_1$ and network configures via RRC a value of $\gamma_1$ to the UE.

In an alternative description of this method, the counting of BD/CCE limits are unchanged. The BD limit per slot/span is unchanged, but the CCE limit per slot/span is divided by $(1+\gamma_1)$.

For Case 2, with explicit linkage, every two linked candidates result in one Polar decoding, as the UE may soft-combine the LLRs from the two repetitions. CCE monitoring is also impacted as the UE needs to apply two different spatial filters to receive the signal. This may be captured using a different scaling factor $\gamma_2$. Since the BD/CCE limits are defined per slot, intra-slot repetition is focused on.

In a second method with BD/CCE limit for Case 2 (repetition and explicit linkage, intra slot), for a UE operating in Case 2, each PDCCH candidate repetition is counted as ½ and each CCE is counted as $1+\gamma_2$, where $\gamma_2$ is determined according to one of the following alternatives.

- $1 \leq \gamma_2 \leq 2$ is a fixed number set by network for all UEs operating in Case 2.
- $1 \leq \gamma_2 \leq 2$ is determined according to UE capability; and the UE reports a value for $\gamma_2$ directly to the network.
- $1 \leq \gamma_2 \leq 2$ is determined according to UE capability; and the UE reports one or multiple candidate values or bounds for $\gamma_2$ and the network configures via RRC a value of $\gamma_2$ to the UE.

In an alternative description of the second method, the counting of BD/CCE limits are unchanged. The BD limits per slot/span is multiplied by 2 and CCE limit per slot/span is divided by $(1+\gamma_2)$.

For Case 3, without explicit linkage, every two linked candidates result in two Polar decoding, as the UE may not necessarily do soft-combining of the LLRs from the two repetitions. CCE monitoring is also impacted as the UE needs to apply two different spatial filters to receive the signal. This may be captured using a different scaling factor $\gamma_3$. Since the BD/CCE limits are defined per slot, intra-slot repetition is focused on.

In a third method with a BD/CCE limit for Case 3 (repetition and no explicit linkage, intra slot), for a UE operating in Case 3, each PDCCH candidate repetition is counted as 1 and each CCE is counted as $1+\gamma_3$, where $\gamma_3$ is determined according to one of the following alternatives.

$1 \le \gamma_3 \le 2$ is a fixed number set by network for all UEs operating in Case 3.

$1 \le \gamma_3 \le 2$ is determined according to UE capability; and the UE reports a value for $\gamma_3$ directly to the network.

$1 \le \gamma_3 \le 2$ is determined according to UE capability; and the UE reports one or multiple candidate values or bounds for $\gamma_3$ and network configures via RRC a value of $\gamma_3$ to the UE.

In an alternative description of the third method, the counting of BD/CCE limits are unchanged. The BD limit per slot/span is unchanged. The CCE limit per slot/span is divided by $(1+\gamma_3)$.

For Case 4, with or without explicit linkage, every two linked candidates result in two Polar decoding as the DCI payload sizes may be different. CCE monitoring is also impacted as the UE needs to apply two different spatial filters to receive the signal. This may be captured using a different scaling factor $\gamma_3$. Since the BD/CCE limits are defined per slot, intra-slot repetition is focused on.

In a fourth method with BD/CCE limit for Case 4 (multi-chance, intra slot), for a UE operating in Case 4, each PDCCH candidate is counted as 1 and each CCE is counted as $1+\gamma_4$ where $\gamma_4$ is determined according to one of the following alternatives.

$1 \le \gamma_4 \le 2$ is a fixed number set by network for all UEs operating in Case 4.

$1 \le \gamma_4 \le 2$ is determined according to UE capability; UE reports a value for $\gamma_4$ directly to the network.

$1 \le \gamma_4 \le 2$ is determined according to UE capability; UE reports one or multiple candidate values or bounds for $\gamma_4$ and network configures via RRC a value of $\gamma_4$ to the UE.

In an alternative description of the fourth method, the counting of BD/CCE limits are unchanged. The BD limit per slot/span is unchanged. The CCE limit is divided by $(1+\gamma_4)$.

With respect to Case 4, if the repetitions are inter-slot, the BD/CCE candidates should be counted unchanged compared to Rel-15/16.

BD/CCE limit modification is defined independently for each case. That is, the UE may report different values of a scaling factor for different cases, or a network may define different values for different cases. For simplicity, it may also be possible to define one single scaling factor for all cases 1) for BD only, 2) for CCE only, or 3) for both BD and CCE.

Maximum Number of Running PDCCHs/PDSCHs

In Rel-15/16, in order to maintain UE complexity at any time, the maximum number of PDCCHs the UE has received, scheduling the PDSCH receptions or PUSCH transmissions for which UE has not received or transmitted any corresponding PDSCH or PUSCH symbol, is 16. For example, it is impossible for the UE to have received 17 PDCCHs scheduling PDSCHs, none of which UE has started to receive.

With M-TRP enhanced PDCCH schemes, multiple transmissions of the same scheduling DCI through repeated or multi-chance PDCCH, should be counted as one for the purpose of the above behavior.

Figure 17:
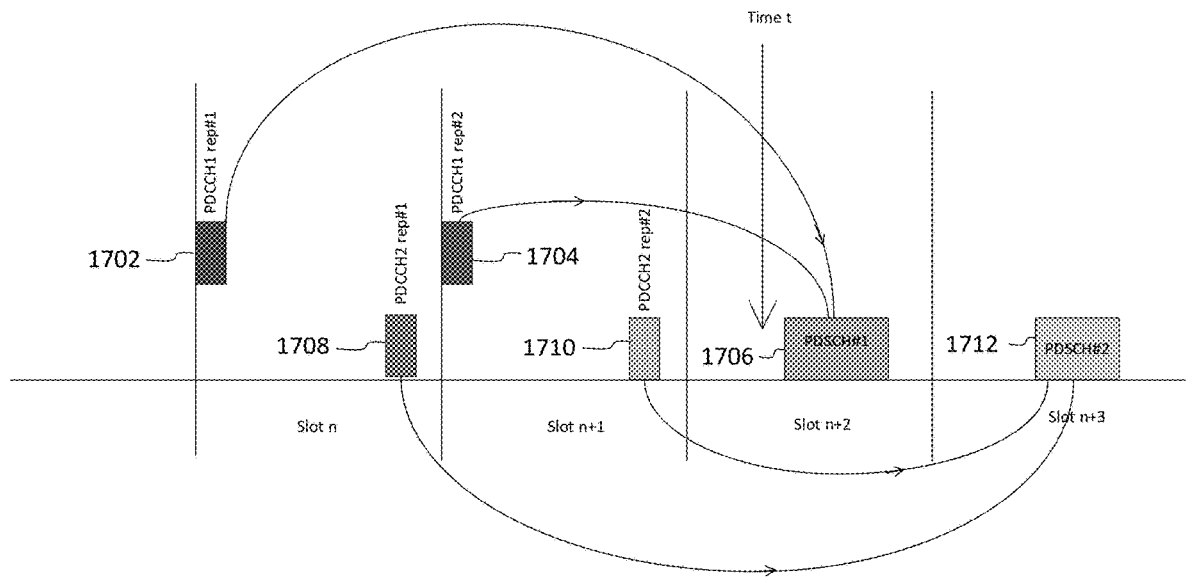
FIG. 17 is a diagram illustrating PDCCH and PDSCH reception, according to an embodiment.

FIG. 17 is a diagram illustrating PDCCH and PDSCH reception, according to an embodiment. A first PDCCH 1702 and a second PDCCH 1704 schedule reception of a first PDSCH 1706. A third PDCCH 1708 and a fourth PDCCH 1710 schedule reception of a second PDSCH 1712. At time t, the UE has received 4 PDCCHs. The four PDCCH schedule less than four PDSCHs. Therefore, UE implementation complexity is less than what it would have previously been.

In a first method with a maximum number of running PDCCHs/PDSCHs, for each scheduled cell, if the UE is configured to receive the enhanced multi-TRP PDCCHs where multiple PDCCHs, via repetition or multi-chance schedule the same PDSCH, the maximum number of running PDCCH/PDSCHs according to the above rule is 16, where all PDCCHs which schedule the same PDSCH are counted as once.

Specifically, for a scheduled cell and at any time, a UE expects to have received at most 16 PDCCHs for DCI formats with a cyclic redundancy check (CRC) scrambled by cell (C)-radio network temporary identifier (RNTI), configured scheduling (CS)-RNTI, or modulation coding scheme (MCS)-C-RNTI scheduling 16 PDSCH receptions for which the UE has not received any corresponding PDSCH symbol, where all the PDCCHs which schedule the same PDSCH are counted once.

In a second method with a maximum number of running PDCCHs/PUSCHs, for each scheduled cell, if the UE is configured to receive the enhanced multi-TRP PDCCHs where multiple PDCCHs, via repetition or multi-chance schedule the same PUSCH, the maximum number of running PDCCH/PUSCHs according to the above rule is 16, where all PDCCHs which schedule the same PUSCH are counted as once.

Specifically, for a scheduled cell and at any time, a UE expects to have received at most 16 PDCCHs for DCI formats with CRC scrambled by C-RNTI, CS-RNTI, or MCS-C-RNTI scheduling 16 PUSCH receptions for which the UE has not transmitted any corresponding PUSCH symbol, where all PDCCHs which schedule the same PUSCH are counted once.

The maximum number of 16 in the first and second methods, can be alternatively determined based on UE capability and RRC configurations.

In a third method with a maximum number of running PDCCHs/PDSCHs, for each scheduled cell, if the UE is configured to receive the enhanced multi-TRP PDCCHs where multiple PDCCHs, via repetition or multi-chance schedule the same PDSCH, the maximum number of running PDCCH/PDSCHs according to the above rule is M, where all PDCCHs which schedule the same PDSCH are counted as once.

Specifically, for a scheduled cell and at any time, a UE expects to have received at most M PDCCHs for DCI formats with CRC scrambled by C-RNTI, CS-RNTI, or MCS-C-RNTI scheduling M PDSCH receptions for which the UE has not received any corresponding PDSCH symbol, where all the PDCCHs which schedule the same PDSCH are counted once.

M is determined according to UE capability and RRC configuration. The UE may report multiple values for M to the gNB, and the gNB may configure the UE via RRC with a value of M to apply to this method.

In a fourth method with a maximum number of running PDCCHs/PUSCHs, for each scheduled cell, If the UE is configured to receive the enhanced multi-TRP PDCCHs where multiple PDCCHs, via repetition or multi-chance schedule the same PUSCH, the maximum number of running PDCCH/PUSCHs according to the above rule is M, where all PDCCHs which schedule the same PUSCH are counted as once.

Specifically, for a scheduled cell and at any time, a UE expects to have received at most M PDCCHs for DCI formats with CRC scrambled by C-RNTI, CS-RNTI, or MCS-C-RNTI scheduling M PUSCH receptions for which the UE has not transmitted any corresponding PUSCH symbol, where all the PDCCHs which schedule the same PUSCH are counted once.

M is determined according to UE capability and RRC configuration. The UE may report multiple values for M to the gNodeB (gNB), and the gNB may configure the UE via RRC with a value of M to apply to this method.

Restriction on Soft Combining

As described above, one of the options for non SFN M-TRP PDCCH transmission is repetition, as described below.

Encoding/rate matching is based on one repetition, and the same coded bits are repeated for the other repetition. Each repetition has the same number of CCEs and coded bits, and corresponds to the same DCI payload.

In this case, a soft combining operation may happen at a UE to handle such repetitions. There may be a potential complexity of a soft combining operation of PDCCH due to its blind nature. Such soft combining would need to be done in a candidate-by-candidate manner, while acknowledging linkage between repetitions for every decoding attempt. Such candidate-by-candidate combining also implies that a UE needs to hold full LLR buffer of two separate SSs until decoding of all candidates is done. Hence, careful consideration would be necessary with option 2 to reduce implementation impact. For example, the number of BDs/CCEs corresponding to repetitions may need to be limited. In addition to a BD/CCE limit defined across all SSs and CORESETs, an additional limitation on BD/CCE for SSs and CORESETs corresponding to the repetitions may need to be considered. The amount of such limitation as well as necessity of such limitation may need to be declared by a UE as a UE capability. Since many BD candidates can exist in overlapping manner in each SS, an LLR buffer in terms of candidates typically becomes much larger than an LLR buffer in terms of CCE. Hence, a UE may need to store an LLR of a first repetition in terms of CCE, which implies that shuffling of LLR and restructuring buffer in terms of candidates would need to happen for both first and second repetition LLRs when soft combining is attempted. An impact of such doubling of processing needs to considered, and restriction on the number of BD/CCE corresponding to repetitions (e.g., up to half amount of per-slot BD/CCE limit), would be required. One way of handling such an increased burden can be using unused CA capability. This can be realized by using per-feature set per component carrier (FSPC)/per-feature set (FS)/per-band combination (BC) capability signaling for this functionality which are described below.

In any case, a situation in which a UE needs to hold an LLR buffer of first repetitions for long time, while a UE also needs to monitor other MOs including more of such first repetitions should be prevented. For example, with inter-slot repetition with two consecutive slots, the amount of the worst case memory corresponding to unresolved first repetitions and the current MO would be two times of per-slot BD/CCE limit, and such amount would further increase with larger distance between slots. Hence, SSs corresponding to such repetitions may need to be contained within one slot or within certain distance in time. Distance between SSs corresponding to such repetitions can be declared as UE capability. For example, support of inter-slot repetition can be declared as UE capability. To allow a UE to handle such increased burden by using unused CA capability, this can be realized by using per-FSPC/per-FS/per-BC capability signaling for this functionality which are described below. Alternatively, there may need to be restriction on the number of SS's or the amount of CCEs or candidates corresponding to first repetitions before the time instance including MOs with second repetitions. For example, a UE is not required to store more than per-slot BD/CCE limit at any given time.

UE capability signaling described in 5G NR specification 38.306 and 38.822 refers to the mechanism with which the UE informs the gNB of its capability to perform certain features. The following is a (non-limiting) list of possible ways of reporting UE capability.

The UE can report its capability to perform certain features in any scenario. In this case, it is said that the UE reports its capability on a per-UE basis.

The UE can report its capability to perform certain features in particular bands. In this case, it is said that the UE reports its capability on a per-band basis.

The UE can report its capability to perform certain features in particular band combinations for CA. In this case, it is said that the UE reports its capability on a per-bandcombination or per-BC basis.

The UE can report its capability to perform certain features in specific band(s) in particular band combination for CA. In this case, a mechanism referred to as feature sets can be used to allow for such flexibility in reporting, and it is said that the UE reports its capability on a per-featureSet or per-FS basis in that case.

The UE can report its capability to perform certain features in specific component carrier(s) (CC) in particular band combination for CA. In this case, a mechanism referred to as feature sets per cc can be used to allow for such flexibility in reporting, and it is said that the UE reports its capability on a per-featureSet per cc or per-FSPC basis in that case.

In the above, band combination is collection of bands to represent CA configuration as described in 3GPP specification 38.101. From the first bullet to the last bullet in the above, a UE's flexibility for declaring support of certain features increase. For example, if feature A and feature B are per-FSPC, a UE can have full flexibility of supporting only one of feature A and B in each CC. However, if those features are per-UE, then a UE would always need to support or not support. Trade-off to added flexibility is its overhead in signaling. Hence, the determination of how certain feature is declared must acknowledge complexity of the feature in UE implementation and associated signaling overhead.

To maintain the UE LLR buffering issue complexity, the following methods are proposed for intra-slot PDCCH monitoring.

In a first method with a maximum number of early MOs, when the UE is configured with intra-slot PDCCH repetition, where a first set of PDCCH candidates in the first SS set are linked to the second set of PDCCH candidates in the second SS set, the first and second SS sets each include L MOs in the slots, where the PDCCH candidates of i-th MO of the first SS set are linked to the PDCCH candidates of the i-th MO of the second SS set. The L MOs of the first and second SS set are such that:

Ordering the MOs of each SS set in ascending order of the start or end symbol of the MO, for every i, the number of MOs of the first SS set which are between the i-th MO of the first SS set and i-th MO of the second SS set is less than or equal to M, where M is either fixed or RRC configured according to a UE capability.

A special case of first method is when the maximum number is equal to zero, which means that the two sets of MOs are fully intermixed.

In a second method with two sets of MOs fully inter-mixed, when the UE is configured with intra-slot PDCCH repetition, where a first set of PDCCH candidates in the first SS set are linked to the second set of PDCCH candidates in the second SS set, the first and second SS sets each include L MOs in the slots, where the PDCCH candidates of i-th MO of the first SS set are linked to the PDCCH candidates of the i-th MO of the second SS set. The L MOs of the first and second SS set are such that:

Ordering the MOs of each SS set in ascending order of the start or end symbol of the MO, none of MOs of the first SS set is between i-th MO of the first SS set and i-th MO of the second SS set.

Figure 18:
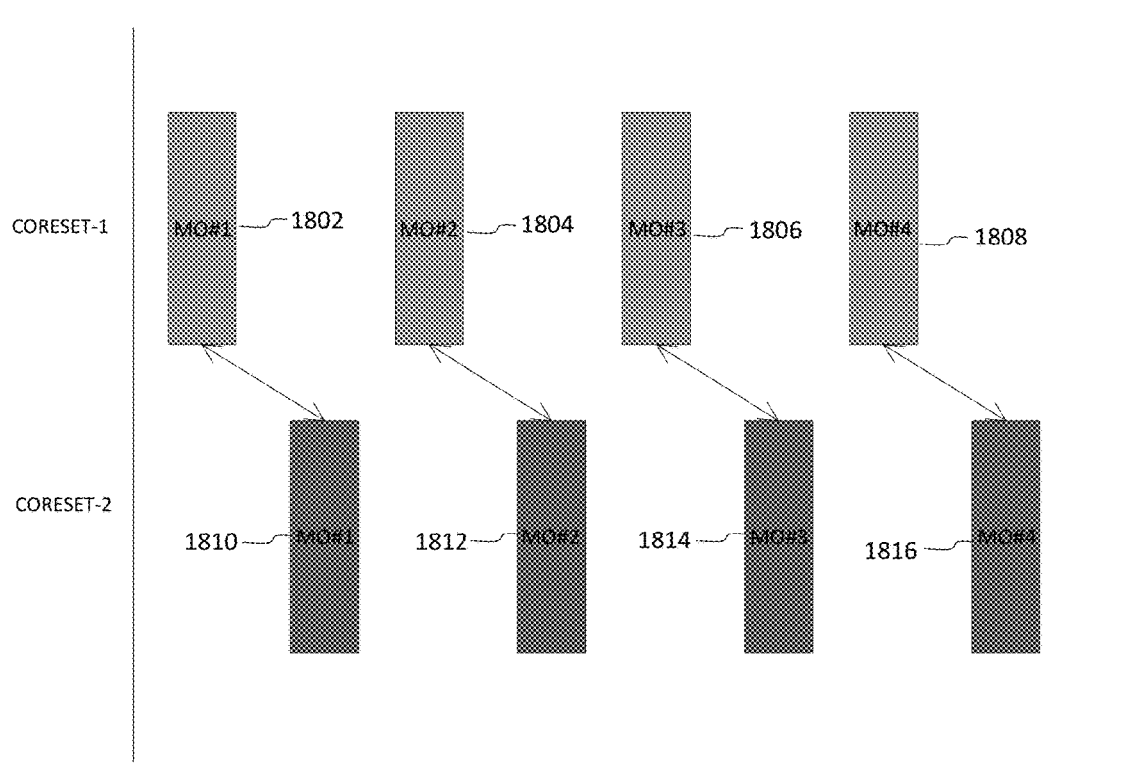
FIG. 18 is a diagram illustrating two sets of MOs fully inter-mixed, according to an embodiment.

FIG. 18 is a diagram illustrating two sets of MOs fully inter-mixed, according to an embodiment. First through fourth MOs 1802-1808 are of a first CORESET and SS set. Fifth through eighth MOs 1810-1816 are of a second CORE-SET and SS set. There is at most M=0 MOs for the first SS set, shown in red, between any two linked MOs one from the first SS set and one from the second SS set.

Figure 19:
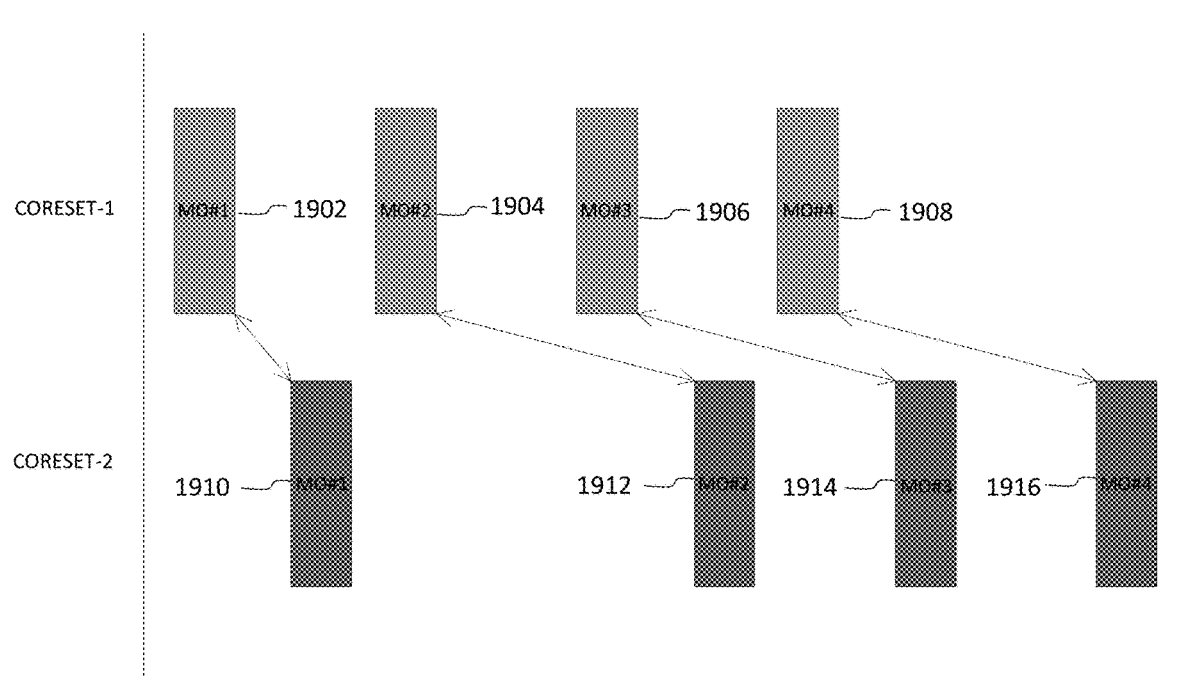
FIG. 19 is a diagram illustrating two sets of MOs fully inter-mixed, according to another embodiment.

FIG. 19 is a diagram illustrating two sets of MOs fully inter-mixed, according to another embodiment. Reference numerals 1902-1916 generally correspond to 1802-1816 and the corresponding description oboe with respect to FIG. 18. There is one MO of the first SS set which appears between the two MOs linked MOs (i.e., MO number 2).

The aforementioned methods may not be sufficient to mitigate the LLR buffering issue. One other aspect which may impact the issue, is the number of close/overlapping linked MOs.

Figure 20:
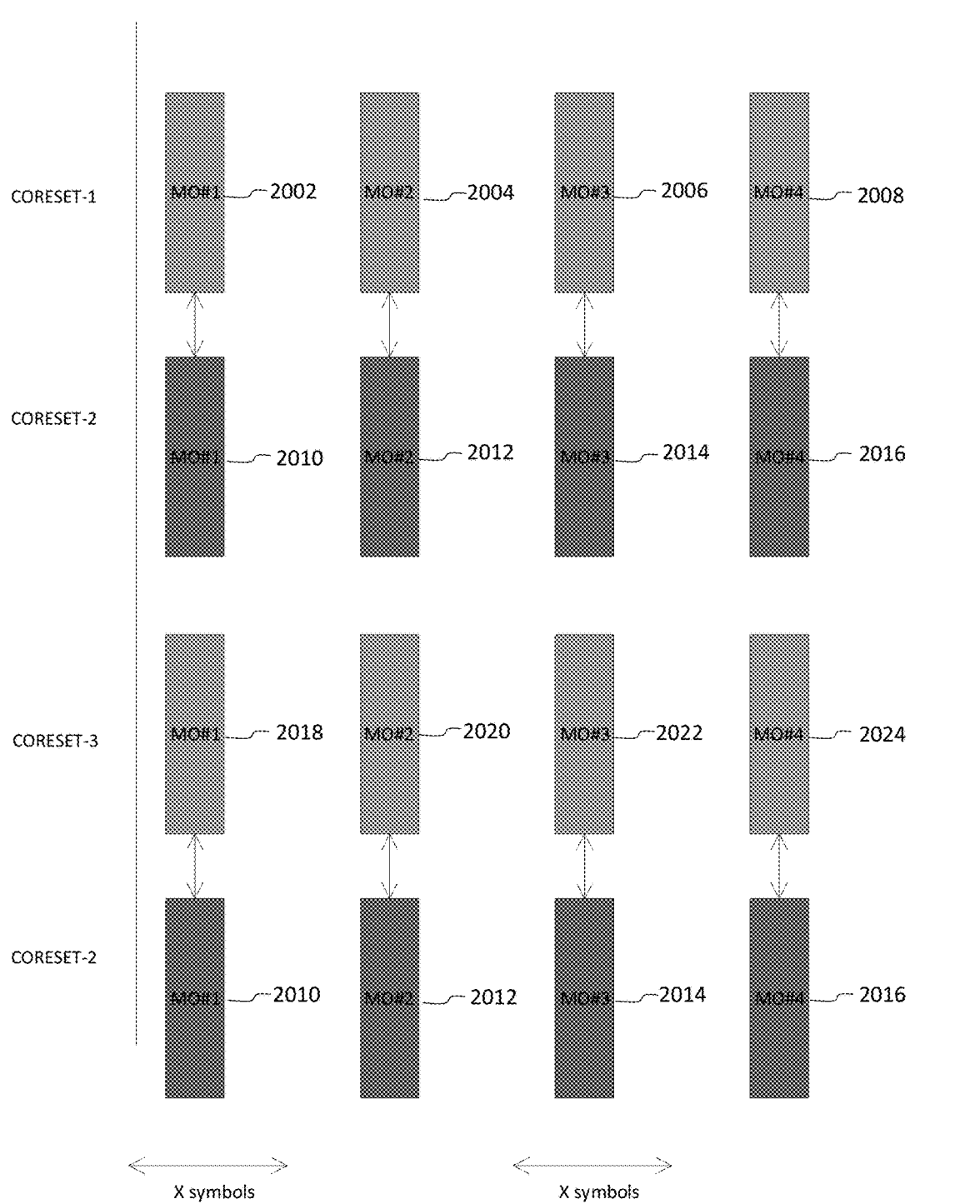
FIG. 20 is a diagram illustrating overlapping linked MOs, according to an embodiment.

FIG. 20 is a diagram illustrating overlapping linked MOs, according to an embodiment. Reference numerals 2002-2016 generally correspond to 1802-1816 and the corresponding description oboe with respect to FIG. 18. Ninth through twelfth MOs 2018-2014 are in a third CORESET. The UE would need to buffer LLRs for the four "first-repetition" MOs, which increases the buffering requirement significantly, even though the configuration satisfies the conditions in the second method, which is the most mitigating case. As a different approach, the maximum number of first-repetition MOs can be limited within any X symbols. Note that an MO is referred to as "first"-repetition MO if it is linked to another MO which starts later in time. In this case, the linked MO which starts later is referred to as "second-repetition" MO.

In a third method with a maximum number of first-repetitions within an interval, when the UE is configured with intra-slot PDCCH repetition, the maximum number of "first-repetition" MOs which are within an interval of X symbols is less than or equal to K, where K is either fixed or determined according to a UE capability. The interval of X symbols can be the PDCCH monitoring spans, or any consecutive X symbols in the slot.

As an example, if the UE reports K=2, FIG. 20 is not supported, as the number of "first-repetition" within X symbols is 4.

Another problematic scenario is when all the conditions provided by the aforementioned methods are satisfied, but the second-repetition MO is too close to a first-repetition MO which appears later in time.

Figure 21:
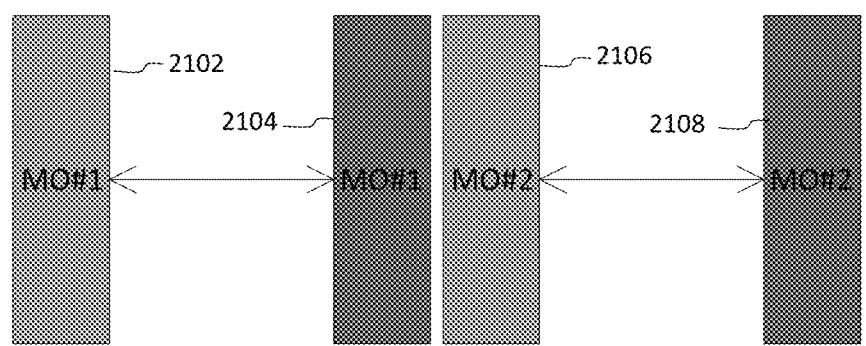
FIG. 21 is a diagram illustrating a second-repetition MO and a first repetition MO later in time, according to an embodiment.

FIG. 21 is a diagram illustrating a second-repetition MO and a first repetition MO later in time, according to an embodiment. The UE may not have sufficient time to finish processing of the two linked first MOs 2102 and 2104 before starting to monitor the linked second MOs 2106 and 2108. Therefore, it would need additional buffer for storing the LLRs of the second MO as the buffer of first MO may be still occupied. To mitigate the issue one approach is to introduce a minimum gap between second-repetition MO and a first-repetition MO which comes later in time.

In a fourth method with a minimum time gap between unlink first-repetition and second repetitions, when the UE is configured with intra-slot PDCCH repetition, and assuming ordering the MOs of the linked SS sets in ascending order of the start or end symbol of the MO, if a second-repetition MO #i of SS set 1 is linked to a second-repetition MO #i of SS set 2, the time gap from the end of the second-repetition to the start of the next first-repetition MO is at least K symbols, where K is either fixed number or determined according to the UE capability.

Figure 22:
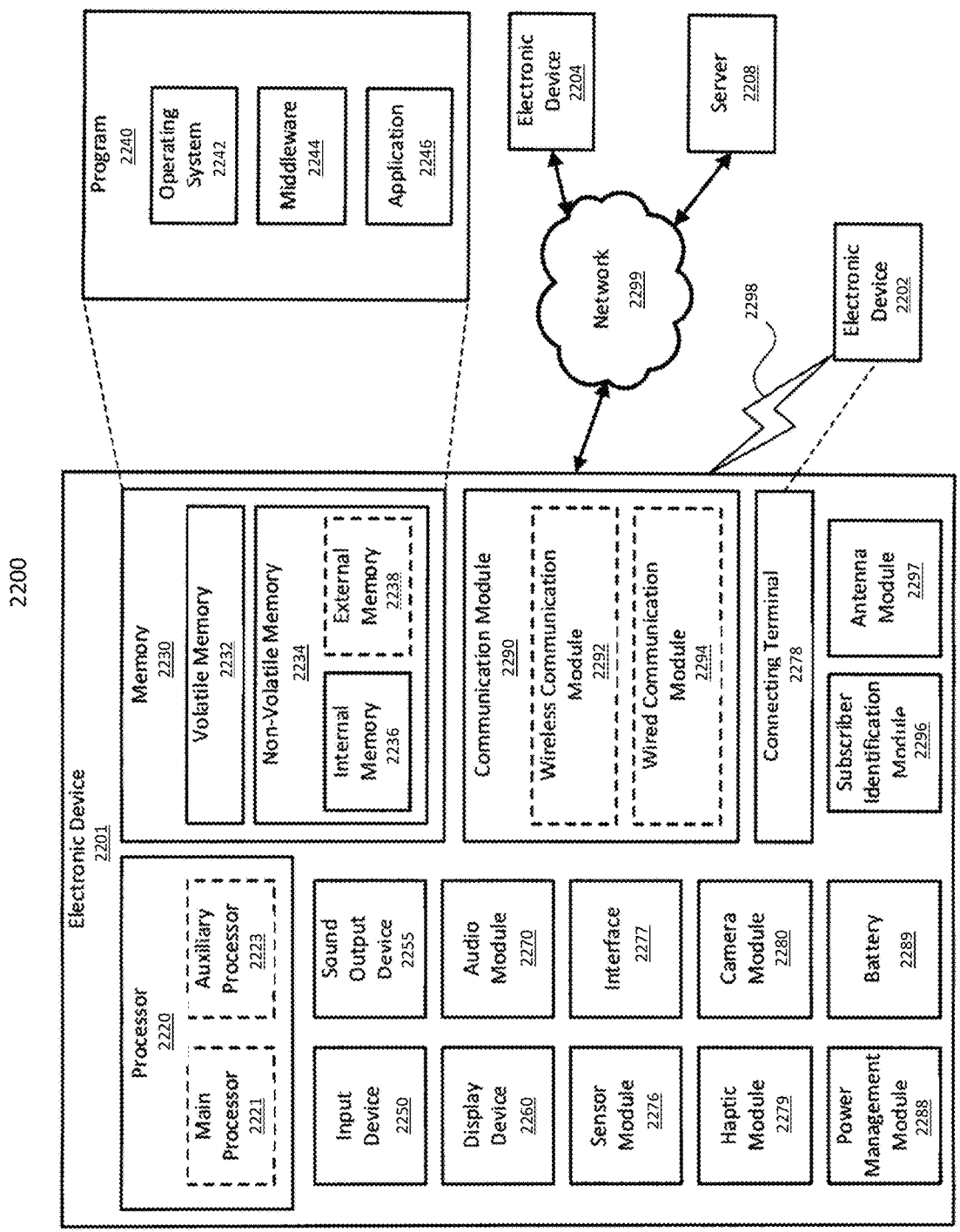
FIG. 22 is a block diagram of an electronic device in a network environment, according to an embodiment.

FIG. 22 is a block diagram of an electronic device in a network environment, according to one embodiment. Referring to FIG. 22, an electronic device 2201 in a network environment 2200 may communicate with an electronic device 2202 via a first network 2298 (e.g., a short-range wireless communication network), or an electronic device 2204 or a server 2208 via a second network 2299 (e.g., a long-range wireless communication network). The electronic device 2201 may communicate with the electronic device 2204 via the server 2208. The electronic device 2201 may include a processor 2220, a memory 2230, an input device 2250, a sound output device 2255, a display device 2260, an audio module 2270, a sensor module 2276, an interface 2277, a haptic module 2279, a camera module 2280, a power management module 2288, a battery 2289, a communication module 2290, a subscriber identification module (SIM) 2296, or an antenna module 2297. In one embodiment, at least one (e.g., the display device 2260 or the camera module 2280) of the components may be omitted from the electronic device 2201, or one or more other components may be added to the electronic device 2201. Some of the components may be implemented as a single integrated circuit (IC). For example, the sensor module 2276 (e.g., a fingerprint sensor, an iris sensor, or an illuminance sensor) may be embedded in the display device 2260 (e.g., a display).

The processor 2220 may execute, for example, software (e.g., a program 2240) to control at least one other component (e.g., a hardware or a software component) of the electronic device 2201 coupled with the processor 2220, and may perform various data processing or computations. As at least part of the data processing or computations, the processor 2220 may load a command or data received from another component (e.g., the sensor module 2276 or the communication module 2290) in volatile memory 2232, process the command or the data stored in the volatile memory 2232, and store resulting data in non-volatile memory 2234. The processor 2220 may include a main processor 2221 (e.g., a central processing unit (CPU) or an application processor (AP)), and an auxiliary processor 2223 (e.g., a graphics processing unit (GPU), an image signal processor (ISP), a sensor hub processor, or a communication processor (CP)) that is operable independently from, or in conjunction with, the main processor 2221. Additionally or alternatively, the auxiliary processor 2223 may be adapted to consume less power than the main processor 2221, or execute a particular function. The auxiliary processor 2223 may be implemented as being separate from, or a part of, the main processor 2221.

The auxiliary processor 2223 may control at least some of the functions or states related to at least one component (e.g., the display device 2260, the sensor module 2276, or the communication module 2290) among the components of the electronic device 2201, instead of the main processor 2221 while the main processor 2221 is in an inactive (e.g., sleep) state, or together with the main processor 2221 while the main processor 2221 is in an active state (e.g., executing an application). The auxiliary processor 2223 (e.g., an image signal processor or a communication processor) may be implemented as part of another component (e.g., the camera module 2280 or the communication module 2290) functionally related to the auxiliary processor 2223.

The memory 2230 may store various data used by at least one component (e.g., the processor 2220 or the sensor module 2276) of the electronic device 2201. The various data may include, for example, software (e.g., the program 2240) and input data or output data for a command related thereto. The memory 2230 may include the volatile memory 2232 or the non-volatile memory 2234.

The program 2240 may be stored in the memory 2230 as software, and may include, for example, an operating system (OS) 2242, middleware 2244, or an application 2246.

The input device 2250 may receive a command or data to be used by other component (e.g., the processor 2220) of the electronic device 2201, from the outside (e.g., a user) of the electronic device 2201. The input device 2250 may include, for example, a microphone, a mouse, or a keyboard.

The sound output device 2255 may output sound signals to the outside of the electronic device 2201. The sound output device 2255 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 2260 may visually provide information to the outside (e.g., a user) of the electronic device 2201. The display device 2260 may include, for example, a display, a hologram device, or a projector and control circuitry to control a corresponding one of the display, hologram device, and projector. The display device 2260 may include touch circuitry adapted to detect a touch, or sensor circuitry (e.g., a pressure sensor) adapted to measure the intensity of force incurred by the touch.

The audio module 2270 may convert a sound into an electrical signal and vice versa. The audio module 2270 may obtain the sound via the input device 2250, or output the sound via the sound output device 2255 or a headphone of an external electronic device 2202 directly (e.g., wired) or wirelessly coupled with the electronic device 2201.

The sensor module 2276 may detect an operational state (e.g., power or temperature) of the electronic device 2201 or an environmental state (e.g., a state of a user) external to the electronic device 2201, and then generate an electrical signal or data value corresponding to the detected state. The sensor module 2276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2277 may support one or more specified protocols to be used for the electronic device 2201 to be coupled with the external electronic device 2202 directly (e.g., wired) or wirelessly. The interface 2277 may include, for example, a high definition multimedia interface (HDMI), a universal serial bus (USB) interface, a secure digital (SD) card interface, or an audio interface.

A connecting terminal 2278 may include a connector via which the electronic device 2201 may be physically connected with the external electronic device 2202. The connecting terminal 2278 may include, for example, an HDMI connector, a USB connector, an SD card connector, or an audio connector (e.g., a headphone connector).

The haptic module 2279 may convert an electrical signal into a mechanical stimulus (e.g., a vibration or a movement) or an electrical stimulus which may be recognized by a user via tactile sensation or kinesthetic sensation. The haptic module 2279 may include, for example, a motor, a piezoelectric element, or an electrical stimulator.

The camera module 2280 may capture a still image or moving images. The camera module 2280 may include one or more lenses, image sensors, image signal processors, or flashes.

The power management module 2288 may manage power supplied to the electronic device 2201. The power management module 2288 may be implemented as at least part of, for example, a power management integrated circuit (PMIC).

The battery 2289 may supply power to at least one component of the electronic device 2201. The battery 2289 may include, for example, a primary cell which is not rechargeable, a secondary cell which is rechargeable, or a fuel cell.

The communication module 2290 may support establishing a direct (e.g., wired) communication channel or a wireless communication channel between the electronic device 2201 and the external electronic device (e.g., the electronic device 2202, the electronic device 2204, or the server 2208) and performing communication via the established communication channel. The communication module 2290 may include one or more communication processors that are operable independently from the processor 2220 (e.g., the AP) and supports a direct (e.g., wired) communication or a wireless communication. The communication module 2290 may include a wireless communication module 2292 (e.g., a cellular communication module, a short-range wireless communication module, or a global navigation satellite system (GNSS) communication module) or a wired communication module 2294 (e.g., a local area network (LAN) communication module or a power line communication (PLC) module). A corresponding one of these communication modules may communicate with the external electronic device via the first network 2298 (e.g., a short-range communication network, such as Bluetooth™, wireless-fidelity (Wi-Fi) direct, or a standard of the Infrared Data Association (IrDA)) or the second network 2299 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 2292 may identify and authenticate the electronic device 2201 in a communication network, such as the first network 2298 or the second network 2299, using subscriber information (e.g., international mobile subscriber identity (IMSI)) stored in the subscriber identification module 2296.

The antenna module 2297 may transmit or receive a signal or power to or from the outside (e.g., the external electronic device) of the electronic device 2201. The antenna module 2297 may include one or more antennas, and, therefrom, at least one antenna appropriate for a communication scheme used in the communication network, such as the first network 2298 or the second network 2299, may be selected, for example, by the communication module 2290 (e.g., the wireless communication module 2292). The signal or the power may then be transmitted or received between the communication module 2290 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 2201 and the external electronic device 2204 via the server 2208 coupled with the second network 2299. Each of the electronic devices 2202 and 2204 may be a device of a same type as, or a different type, from the electronic device 2201. All or some of operations to be executed at the electronic device 2201 may be executed at one or more of the external electronic devices 2202, 2204, or 2208. For example, if the electronic device 2201 should perform a function or a service automatically, or in response to a request from a user or another device, the electronic device 2201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2201. The electronic device 2201 may provide the outcome, with or without further processing of the outcome, as at least part of a reply to the request. To that end, a cloud computing, distributed computing, or client-server computing technology may be used, for example.

One embodiment may be implemented as software (e.g., the program 2240) including one or more instructions that are stored in a storage medium (e.g., internal memory 2236 or external memory 2238) that is readable by a machine (e.g., the electronic device 2201). For example, a processor of the electronic device 2201 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for explicitly linking repeated physical downlink control channels (PDCCHs) by a user equipment (UE):
    receiving, at the UE, PDCCHs from a network;
    prior to decoding the PDCCHs, identifying PDCCH candidate numbers of the PDCCHs; and
    linking, at the UE, two or more of the PDCCHs having common PDCCH candidate numbers as repeated PDCCHs, wherein the common PDCCH candidate numbers are across search space (SS) sets of a control resource set (CORESET), and each of the repeated PDCCHs comprises downlink control information (DCI) that schedules reception of a same physical downlink shared channel (PDSCH) at the UE,
    wherein the repeated PDCCHs are received in accordance with the UE and the network communicating using a multi-transmission and reception point (TRP) repetition scheme or a multi-TRP multi-chance scheme.

2. The method of claim 1, wherein each of the repeated PDCCHs is associated with a respective one of the SS sets, and each SS set is associated with a respective transmission configuration indicator (TCI) state of the CORESET.

3. The method of claim 2, wherein each repeated PDCCH has a same PDCCH candidate number in a different SS set.

4. The method of claim 2, wherein values of downlink assignment indicator (DAI) fields of the repeated PDCCHs are identical.

5. The method of claim 4, further comprising:
    applying the value of the DAI fields obtained from any of the repeated PDCCHs to a monitoring opportunity (MO) index corresponding to a first PDCCH of the repeated PDCCHs, wherein the repeated PDCCHs comprise two PDCCHs, and each PDCCH in the repeated PDCCHs is linked to only one other PDCCH in the repeated PDCCHs.

6. The method of claim 5, further comprising:
determining an ACK/NACK payload size corresponding to the repeated PDCCHs based on the value of the DAI field and the MO index.

7. The method of claim 5, wherein the UE assumes that the PDCCH is transmitted from the MO index corresponding to the first PDCCH.

8. The method of claim 4, further comprising:
predetermining, between the UE and the network, a PDCCH from among the repeated PDCCHs for DAI field value application; and
applying the value of the DAI fields obtained from any of the repeated PDCCHs to an MO index corresponding to the predetermined PDCCH of the repeated PDCCHs,
wherein the repeated PDCCHs comprises three or more PDCCHs.

9. The method of claim 8, further comprising:
determining an ACK/NACK payload size corresponding to the repeated PDCCHs based on the value of the DAI field and the MO index.

10. The method of claim 8, wherein the UE assumes that the PDCCH is transmitted from the MO index corresponding to the predetermined PDCCH.

11. A user equipment (UE) comprising:
a processor; and
a non-transitory computer readable storage medium storing instructions that, when executed, cause the processor to:
receive physical downlink control channels (PDCCHs) from a network;
prior to decoding the PDCCHs, identify PDCCH candidate numbers of the PDCCHs; and
link two or more of the PDCCHs having common PDCCH candidate numbers as repeated PDCCHs, wherein the common PDCCH candidate numbers are across search space (SS) sets of a control resource set (CORESET), and each of the repeated PDCCHs comprises downlink control information (DCI) that schedules reception of a same physical downlink shared channel (PDSCH) at the UE:
wherein the repeated PDCCHs are received in accordance with the UE and the network communicating using a multi-transmission and reception point (TRP) repetition scheme or a multi-TRP multi-chance scheme.

12. The UE of claim 11, wherein each of the repeated PDCCHs is associated with a respective one of the SS sets, and each SS set is associated with a respective transmission configuration indicator (TCI) state of the CORESET.

13. The UE of claim 12, wherein each repeated PDCCH has a same PDCCH candidate number in a different SS set.

14. The UE of claim 12, wherein values of downlink assignment indicator (DAI) fields of the repeated PDCCHs are identical.

15. The UE of claim 14, wherein the instructions further cause the processor to:
apply the value of the DAI fields obtained from any of the repeated PDCCHs to a monitoring opportunity (MO) index corresponding to a first PDCCH of the repeated PDCCHs,
wherein the repeated PDCCHs comprise two PDCCHs, and each PDCCH in the repeated PDCCHs is linked to only one other PDCCH in the repeated PDCCHs.

16. The UE of claim 15, wherein the instructions further cause the processor to:
determine an ACK/NACK payload size corresponding to the repeated PDCCHs based on the value of the DAI field and the MO index.

17. The UE of claim 15, wherein the UE assumes that the PDCCH is transmitted from the MO index corresponding to the first PDCCH.

18. The UE of claim 14, wherein the instructions further cause the processor to:
predetermine, with the network, a PDCCH from among the repeated PDCCHs for DAI field value application; and
apply the value of the DAI fields obtained from any of the repeated PDCCHs to an MO index corresponding to the predetermined PDCCH of the repeated PDCCHs,
wherein the repeated PDCCHs comprises three or more PDCCHs.

19. The UE of claim 18, wherein the instructions further cause the processor to:
determine an ACK/NACK payload size corresponding to the repeated PDCCHs based on the value of the DAI field and the MO index.

20. The UE of claim 18, wherein the UE assumes that the PDCCH is transmitted from the MO index corresponding to the predetermined PDCCH.

* * * * *